(12) United States Patent
Miyakoshi

(10) Patent No.: US 8,102,436 B2
(45) Date of Patent: Jan. 24, 2012

(54) IMAGE-CAPTURING APPARATUS AND METHOD, RECORDING APPARATUS AND METHOD, AND REPRODUCING APPARATUS AND METHOD

(75) Inventor: Daisuke Miyakoshi, Kanagawa (JP)

(73) Assignee: Sony Corporation (JP)

( * ) Notice: Subject to any disclaimer, the term of this patent is extended or adjusted under 35 U.S.C. 154(b) by 485 days.

(21) Appl. No.: 12/224,082

(22) PCT Filed: Dec. 18, 2007

(86) PCT No.: PCT/JP2007/074328
§ 371 (c)(1),
(2), (4) Date: Aug. 14, 2008

(87) PCT Pub. No.: WO2008/075688
PCT Pub. Date: Jun. 26, 2008

(65) Prior Publication Data
US 2009/0059031 A1 Mar. 5, 2009

(30) Foreign Application Priority Data
Dec. 18, 2006 (JP) .................................. 2006-339529

(51) Int. Cl.
*H04N 5/235* (2006.01)
*H04N 5/262* (2006.01)
(52) U.S. Cl. ..................................... 348/222.1; 348/239
(58) Field of Classification Search ............... 348/222.1, 348/220.1, 333.05, 333.11, 345, 349, 239
See application file for complete search history.

(56) References Cited

U.S. PATENT DOCUMENTS

| | | | |
|---|---|---|---|
| 6,204,879 B1 | 3/2001 | Koseki et al. | |
| 6,243,139 B1 * | 6/2001 | Takahashi et al. | .......... 348/420.1 |
| 7,242,432 B2 * | 7/2007 | Watanabe | ................ 348/333.11 |
| 2003/0052986 A1 * | 3/2003 | Matsumoto | .............. 348/333.05 |
| 2004/0036807 A1 * | 2/2004 | Takahashi et al. | ............. 348/700 |
| 2004/0141067 A1 | 7/2004 | Nakayama et al. | |
| 2006/0165179 A1 | 7/2006 | Feuer et al. | |

FOREIGN PATENT DOCUMENTS

| | | |
|---|---|---|
| JP | 64-002480 A | 1/1989 |
| JP | 01-105674 A | 4/1989 |
| JP | 09-083952 A | 3/1997 |
| JP | 09-163208 A | 6/1997 |
| JP | 09-214836 A | 8/1997 |
| JP | 10-051735 A | 2/1998 |
| JP | 10-276367 A | 10/1998 |
| JP | 2000-299810 A | 10/2000 |
| JP | 2003-189186 A | 7/2003 |
| JP | 2004-180240 A | 6/2004 |
| JP | 2005-295423 | 10/2005 |
| WO | 0177871 A1 | 10/2001 |

* cited by examiner

*Primary Examiner* — Trung Diep
(74) *Attorney, Agent, or Firm* — Lerner, David, Littenberg, Krumholz & Mentlik, LLP

(57) ABSTRACT

The present invention is applied to, for example, an image-capturing apparatus to generate an image signal by all-angle-of-view thinning-out read processing for every set field or frame and an image signal by all-pixel partially read processing on remaining fields or frames.

21 Claims, 21 Drawing Sheets

FIG. 6
(A)
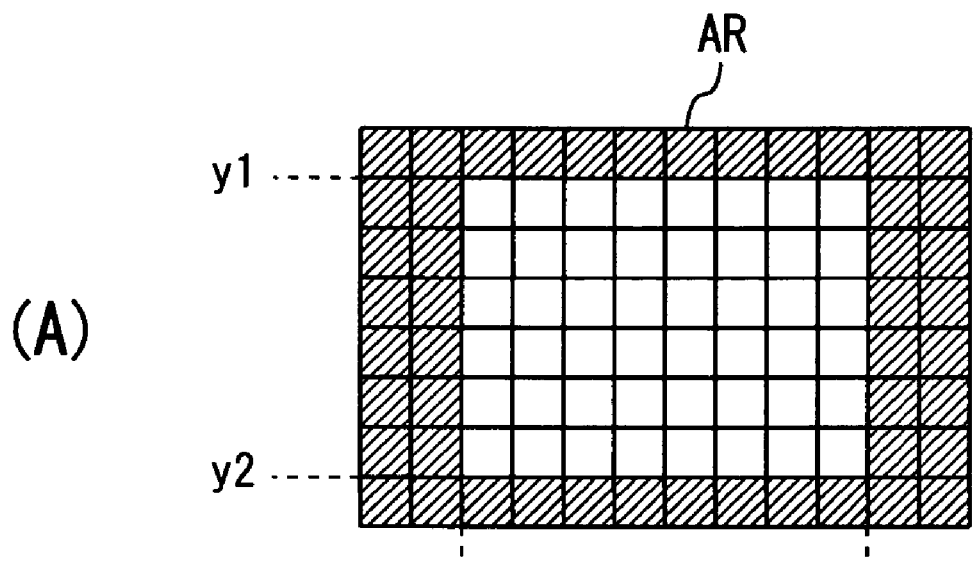
(B)
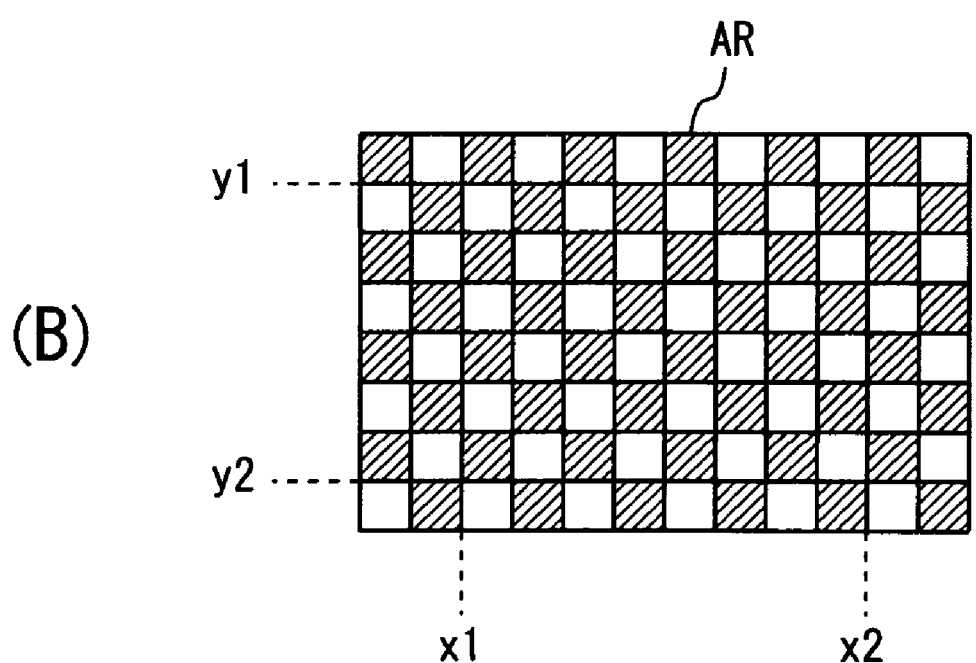

FIG. 20

IMAGE-CAPTURING APPARATUS AND METHOD, RECORDING APPARATUS AND METHOD, AND REPRODUCING APPARATUS AND METHOD

CROSS-REFERENCES TO RELATED APPLICATIONS

The present application is a national phase entry under 35 U.S.C. §371 of International Application No. PCT/JP2007/074328 filed Dec. 18, 2007, published on Jun. 26, 2008 as WO 2008/075688 A1, which claims priority from Japanese Patent Application No. JP 2006-339529 filed in the Japanese Patent Office on Dec. 18, 2006.

TECHNICAL FIELD

The present invention relates to image-capturing apparatus and method, recording apparatus and method, and reproducing apparatus and method.

BACKGROUND ART

Conventionally, a method of recording an image signal of an image-captured picture on a recording medium with it being made delayed using a memory having a large capacity has been proposed in Japanese patent application publication No. H09-83952. According to this method disclosed in the Japanese patent application publication No. H09-83952, it is possible to start recording from an image at a point of time retroacted by a set period of time from a point of time when a user instructs a start of image capture, thereby enabling a precious chance of image capture to be not missed.

Further, a method of recording a slow motion image by reducing a field frequency of an image signal using a memory has been proposed in Japanese Patent Application Publication No. 2005-295423. In other words, in this method disclosed in the Japanese Patent Application Publication No. 2005-295423, image signals are output at higher speed than that of a field frequency (50 or 60 fields/second) of a normal video signal and these image signals are successively stored in a memory in cyclical manner. These image signals thus stored in the memory are then read out thereof at the field frequency of the normal video signal and recorded on a recording medium. Hereinafter, such processing of obtaining any image-captured picture at a field or frame frequency higher than that of the normal video signal is referred to as "a high-speed image capture".

Further, in conjunction with output of an image signal from an image-capturing device, a method of reducing a resolution of image-captured picture, namely, decreasing a number of pixels of the image-captured picture, which relates to the image signal output from the image-capturing device, thereby preventing data rate of the image signal from increasing has been proposed in Japanese Patent Application Publications Nos. S64-2480 and H01-105674. A method of preventing data rate from increasing by capturing a part of the image-captured picture has also been proposed in Japanese Patent Application Publication No. H10-51735.

However, when performing the high-speed image capture based on the method of the Japanese Patent Application Publication No. 2005-295423, a period of time for the high-speed image capture is limited in various ways, so that such a problem as to miss a precious chance of image capture can occur.

In other words, in this method, the image signal is stored in the memory at high speed and then, read out of the memory and recorded on the recording medium, so that a period of time that is available for capturing an image at one image capture chance can be limited by a capacitance of the memory. Accordingly, in a case where a desired scene is taken for a long period of time, it is after all difficult to perform the high-speed image capture on the whole scene. Further, in this method, it is impossible to perform image capture on a next scene after all the image signals stored in the memory would have been not read out thereof. Therefore, in a case where desired scenes are repeated at short intervals, taking a part of any repeated scenes may be missed.

As one method for solving such problem, a method of obtaining the image signal at high field or frame frequency and recording it on a mass recording medium directly is conceivable.

If, however, generating the image signal at high field or frame frequency, it is mostly difficult, in practical term, to generate the image signal indicating all the pixels from image-capturing device as a case where the image signal is generated at the field or frame frequency of the normal video signal. Accordingly, in this method, it is necessary, at a time of the high-speed image capture, to reduce a resolution of the image-captured picture on an image output from the image-capturing device as disclosed in the Japanese Patent Application Publications Nos. S64-2480 and H01-105674 or to decrease an angle of view in the image-captured picture as disclosed in the Japanese Patent Application Publication No. H10-51735. Thus, any image-captured picture having a desired resolution cannot be obtained, thereby causing deterioration in picture quality or causing an image-captured picture having a desired angle of view to be not obtained.

DISCLOSURE OF INVENTION

The present invention is made by taking the above-mentioned points into consideration and proposes image-capturing apparatus and method, which can avoid deterioration in picture quality or the like effectively and realize the high-speed image capture without missing any precious chance of image capture, recording apparatus and method, and reproducing apparatus and method, which can record and reproduce image signals obtained by performing the high-speed image capture.

In order to solve the above-mentioned problems, an image-capturing apparatus according to the present invention is provided with an image sensor that generates an image signal of an image-captured picture, and a control unit that controls the image sensor to switch in units of a set period of time between an all-angle-of-view thinning-out read processing in which a thinning-out read is performed on a pixel in an effective image area to generate the image signal and an all-pixel partially read processing in which all the pixels of a partial region of the effective image area are read out of the partial region to generate the image signal.

Further, a recording apparatus according to the present invention is provided with an image compression unit that performs compression processing on an image signal of an image-captured picture generated by allowing an image sensor to switch in units of a set period of time between an all-angle-of-view thinning-out read processing in which a thinning-out read is performed on a pixel in an effective image area to generate the image signal and an all-pixel partially read processing in which all the pixels of a partial region of the effective image area are read out of the partial region to generate the image signal so as to generate coded data, and a recording unit that records the coded data, wherein the image compression unit performs the compression processing on the image signal obtained by performing the all-angle-of-view thinning-out read processing based on a coding system using predictive coding and performs the compression processing on the image signal obtained by performing the all-pixel partially read processing based on a coding system without using the predictive coding.

Additionally, a reproducing apparatus according to the present invention is provided with a reproduction unit that reads coded data out of recording media on which after an image sensor has switched in units of a set period of time between an all-angle-of-view thinning-out read processing in which a thinning-out read is performed on a pixel in an effective image area to generate an image signal and an all-pixel partially read processing in which all the pixels of a partial region of the effective image area are read out of the partial region to generate the image signal, the image signal obtained by performing the all-angle-of-view thinning-out read processing is compression-processed based on a coding system using predictive coding and recorded as the coded data and the image signal obtained by performing the all-pixel partially read processing is compression-processed based on a coding system without using the predictive coding and recorded as the coded data, an image decompression unit that decompresses the read coded data to generate the image signal, and an image composition unit that performs composition using the image signal generated in the image decompression unit, wherein the image composition unit combines the image signal obtained by performing the all-angle-of-view thinning-out read processing and the image signal obtained by performing the all-pixel partially read processing.

Further, an image-capturing method, a recording method, and a reproducing method corresponding to the mage pickup apparatus, the recording apparatus, and the reproducing apparatus according to the present invention are also provided.

Based on a configuration according to the present invention, if an image signal is generated and recorded at a field or frame frequency higher than a reference field or frame frequency, in a top field or frame within a period of reference field or frame time, the image signal is generated by the all-angle-of-view thinning-out read processing and in remaining fields or frames within the period of reference field or frame time, the image signal is generated by the all-pixel partially read processing. Thus, an amount of signal that outputs from the image sensor during the period of reference field or frame time may be reduced as compared with a case where image-captured picture of all the angle of view is obtained within all the fields or frames, so that it can be directly recorded on a mass recording medium. Accordingly, a restriction in a case of recording it through a memory can be avoided, thereby allowing the high-speed image capture to be realized without missing a precious chance of image capture. It is also possible to reduce deterioration in the picture quality by combining the image signal obtained by performing the all-angle-of-view thinning-out read processing and the image signal obtained by performing the all-pixel partially read processing. This avoids deterioration in the picture quality or the like effectively, thereby allowing the high-speed image capture to be realized without missing a precious chance of image capture and enabling the image signal obtained by performing the high-speed image capture to be recorded and reproduced.

BRIEF DESCRIPTION OF DRAWINGS

FIG. 6 are diagrams illustrating coordinate relationship of an image-captured picture and boundaries.

FIG. 20 are time diagrams of a case where a high-speed image capture is performed at a variable rate.

BEST MODE FOR CARRYING OUT THE INVENTION

Figure 1:
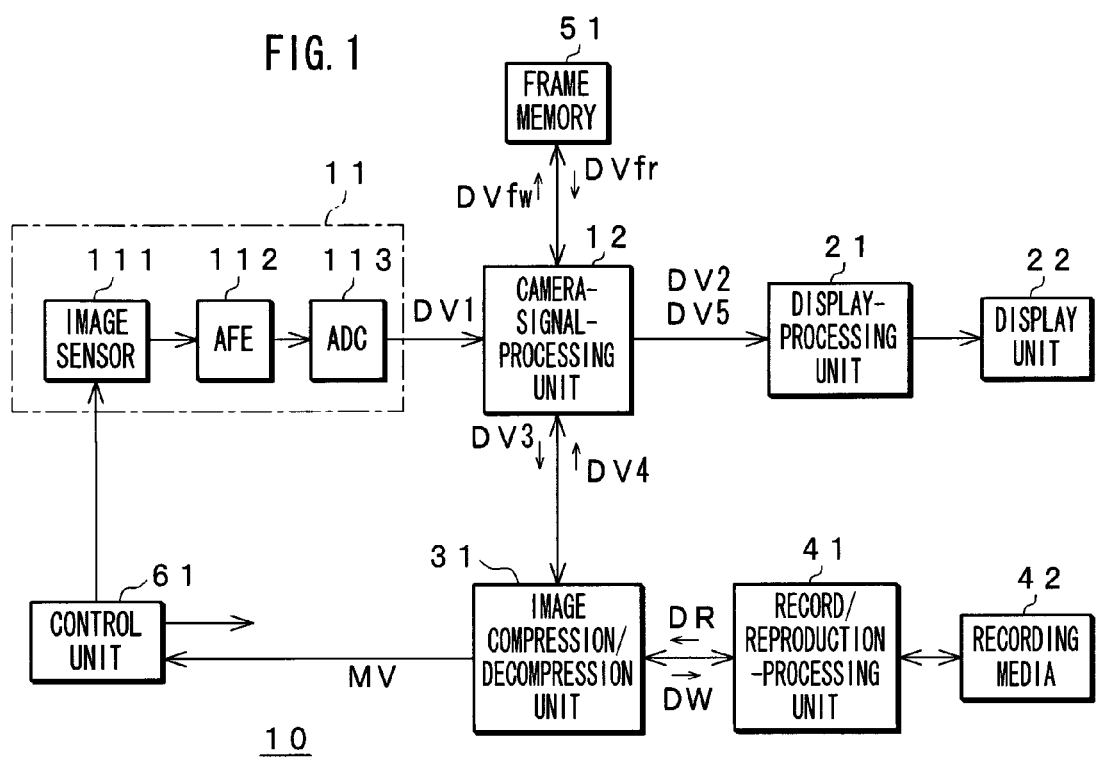
FIG. 1 is a block diagram showing a configuration of an image-capturing apparatus.

The following will describe embodiments of the present invention with reference to the drawings. FIG. 1 is a block diagram showing a configuration of an image-capturing apparatus according to the present invention. The image-capturing apparatus 10 is designed so as to be switchable to a standard image capture mode that is an operation mode at an ordinary image capture time or a high-speed image capture mode that is an operation mode at a high-speed image capture, according to manipulation by a user.

When the standard image capture mode is set, the image-capturing apparatus 10 generates an image signal in predetermined units of the period of reference time, performs camera signal processing, image compression processing and the like on this image signal, and records it on recording media. Herein, the unit of period of reference time is referred to as a period of field or frame time, which is used in a television system, and for example, if the unit of period of reference time is set to (1/60) second, an image signal of interlaced scanning system is generated with its period of field time being (1/60) second or an image signal of non-interlaced system is generated with its period of frame time being (1/60) second. It is to be noted that, if the image signal of non-interlaced system is generated, the unit of period of reference time is referred to as a period of reference frame time and a frame rate having a cycle of the unit of period of reference time is referred to as a reference frame rate. Further, if the image signal of interlaced system is generated, the unit of period of reference time is referred to as a period of reference field time and a field rate having a cycle of the unit of period of reference time is referred to as a reference field rate.

When the high-speed image capture mode is set, the image-capturing apparatus 10 generates an image signal at higher rate than the reference frame rate (or reference field rate) in the standard image capture mode with an integral, multiple of the reference frame rate (or the reference field rate), performs camera signal processing, image compression processing and the like on this image signal, and records it on the recording media. Herein, a period of frame (field) time when a frame rate (a field rate) has an integral multiple of the reference frame rate (or the reference field rate) is referred to as a unit of a set period of time.

Thus, if the frame rate (field rate) becomes higher and the unit of the set period of time becomes shorter, it is difficult for the image-capturing apparatus 10 to generate the image signal indicating all the pixels from an effective image area of an image-capturing surface in solid-state image-capturing device which is used in an image-capturing unit 11. Therefore, if the frame rate (field rate) is higher than that of the standard image capture mode, namely, the unit of the set period of time is shorter than the unit of the reference period of time, the image-capturing apparatus 10 performs processing in which pixel thinning-out or line thinning-out is performed on the pixels in the effective image area to generate the image signal (hereinafter, referred to as "all-angle-of-view thinning-out read processing") or processing in which all the pixels of a partial region of the effective image area are read out thereof to generate the image signal (hereinafter, referred to as "an all-pixel partially read processing") to reduce an amount of signal. The image-capturing apparatus 10 then performs camera signal processing, image compression processing and the like on the image signal generated by the all-angle-of-view thinning-out read processing or the all-pixel partially read processing, and records it on the recording media. Further, when reproducing an image-captured picture recorded at the high-speed image capture mode, the image-capturing apparatus 10 combines the image signal generated by the all-angle-of-view thinning-out read processing with the image signal generated by the all-pixel partially read processing, thereby enabling a reproduced image having less deterioration in picture quality to be obtained. The following description will be carried out on the understanding that the image signal of non-interlaced system is generated in the image-capturing apparatus 10.

The image-capturing unit 11 of the image-capturing apparatus 10 is configured by using an image sensor 111, an analog front end (AFE) 112, and an analog-digital converter (ADC) 113, and operations of the image-capturing unit 11 are controlled under a control unit 61, which will be described later.

The image sensor 111 of the image-capturing unit 11 is configured by using solid-state image-capturing device of complementary metal oxide semiconductor (CMOS) type or the like. The image sensor 111 performs photoelectric conversion processing on an optical image formed on the image-capturing surface by a lens unit, which is not shown, and outputs an image signal constituted of a color signal of primary colors, for example, red, green and blue. It is to be noted that the image sensor 111 is provided with a correlated double sampling (CDS) circuit in which correlated double sampling processing is carried out, thereby reducing any noise in the image signal.

When the image-capturing apparatus 10 is set to the standard image capture mode, the image sensor 111 is controlled under the control unit 61 and performs processing such that all the pixels are read out of the effective image area of the image-capturing surface in the solid-state image-capturing device (hereinafter, referred to as "all-pixel and all-angle-of-view read processing") to output an image signal with a reference frame rate, for example, 60 frames/second (fps).

Figure 2:
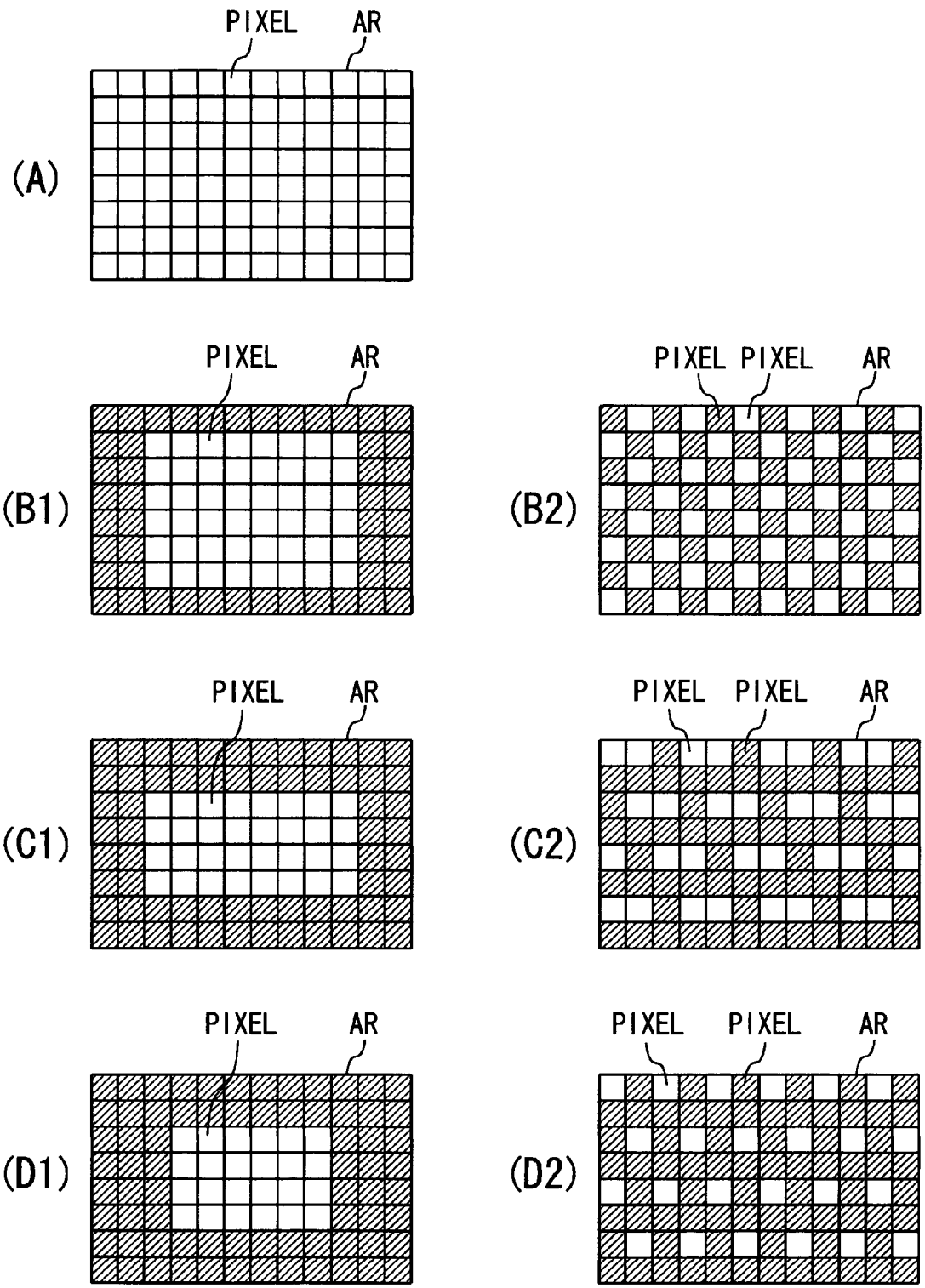
FIG. 2 are diagrams illustrating operations of an image sensor.

FIG. 2 illustrate pixel positions in the image signal output from the image sensor 111 and the pixels indicated by oblique lines indicate pixels which is not included in the image signal. Herein, if the standard image capture mode is set, the image sensor 111 reads all the pixels out of the effective image area AR of the image-capturing surface as shown in FIG. 2(A) to output the image signal.

Further, when the image-capturing apparatus 10 is set to the high-speed image capture mode, the image sensor 111 is controlled under the control unit 61 and performs the all-angle-of-view thinning-out read processing or the all-pixel partially read processing to output the image signal at a higher frame rate than the reference frame rate with an integral multiple thereof. For example, if the frame rate is 60 frames/second (fps), in the high-speed image capture mode, the image signal with frame rate of 120 (fps), 180 (fps), or 240 (fps) is output. The image sensor 111 also adjusts an interval between the thinning-out reads in the all-angle-of-view thinning-out read processing or a region size in the all-pixel partially read processing based on the frame rate so that the image signal with a set frame rate can be output from the image-capturing unit 11.

Herein, if the frame rate is set to a rate that is twice the reference frame rate in the standard image capture mode, all the pixels in a rectangular region having an area that is a half of the effective image area AR as a partial region of the effective image area AR in the image-capturing surface are read out of the rectangular region as shown in, for example, FIG. 2 (B1) in the all-pixel partially read processing. Further, in the all-angle-of-view thinning-out read processing, half of the total number of pixels are read out of the effective image area AR by performing the thinning-out read as shown in, for example, FIG. 2 (B2). The image sensor 111 performs the pixel thinning-out processing by adding the output signals of same color photo sensors adjacently arranged in a horizontal way and outputting them. The image sensor 111 also performs the line thinning-out processing by adding the output signals of same color photo sensors adjacently arranged in a vertical way and outputting them. If such the all-angle-of-view thinning-out read processing and the all-pixel partially read processing are performed, an amount of the image signal output from the image sensor 111 during the period of reference frame time may be made equal to that of the standard image capture mode even when the frame rate is set to the rate that is twice the reference frame rate.

If the frame rate is set to a rate that is triple the reference frame rate in the standard image capture mode, all the pixels in a rectangular region having an area that is one third of the effective image area AR as a partial region of the effective image area AR in the image-capturing surface are read out of the rectangular region as shown in, for example, FIG. 2 (C1) in the all-pixel partially read processing. Further, in the all-angle-of-view thinning-out read processing, one third of the total number of pixels is read out of the effective image area AR by performing the thinning-out read as shown in, for example, FIG. 2 (C2). Further, when the frame rate is set to a rate that is four times the reference frame rate in the standard image capture mode, all the pixels in a rectangular region having an area that is one quarter of the effective image area AR are read out of the rectangular region as shown in, for example, FIG. 2 (D1) in the all-pixel partially read processing. In the all-angle-of-view thinning-out read processing, one quarter of the total number of pixels is also read out of the effective image area AR by performing the thinning-out read as shown in, for example, FIG. 2 (D2). If such the all-pixel partially read processing and the all-angle-of-view thinning-out read processing are performed, an amount of the image signal may be also made equal to that of the standard image capture mode even when the frame rate is set to the rate that is three or four times the reference frame rate.

It is to be noted that if a thinning-out pattern in the all-angle-of-view thinning-out read processing is changed for every frame, the image sensor 111 can prevent a pixel at the same pixel position from being thinned-out every time.

The image sensor 111 is also controlled under the control unit 61 and outputs the image signal obtained by performing the all-angle-of-view thinning-out read processing at a top frame within the period of reference frame time in a case where seen by dividing the output signal during the period of reference frame time in the standard image capture mode if the image-capturing apparatus 10 is set to the high-speed image capture mode. The image sensor 111 further outputs the image signal obtained by performing the all-pixel partially read processing at a period of frame time without the top frame in the period of reference frame time.

The analog front end (AFE) 112 performs automatic gain control (AGC) processing on the image signal output from the image sensor 111 and controls a gain of the image signal. The analog-digital converter (ADC) 113 converts the analog image signal processed in the AFE 112 into a digital image signal DV1.

A camera-signal-processing unit 12 is controlled under the control unit 61 and performs camera-signal-processing on the image signal DV1 output from the image-capturing unit 11 to output it to a display-processing unit 21 as a monitor image signal DV2 when performing monitor display using the image signal generated in the image-capturing unit 11. The camera-signal-processing unit 12 also outputs a camera-signal-processed image signal DV3 to an image compression/decompression unit 31 when a user's manipulation instructing a record of the image signal is performed while the monitor image signal DV2 is supplied to the display-processing unit 21. The camera-signal-processing unit 12 further performs camera-signal-processing on an image signal DV4 supplied from the image compression/decompression unit 31 when performing any reproduction operations of the recorded image-captured picture to output it as a reproduction image signal DV5 to the display-processing unit 21. This camera-signal-processing unit 12 performs a white balance adjustment processing, a color compensation processing, an auto focus (AF) processing, an auto exposure (AE) processing, and the like as the camera signal processing. Additionally, the camera-signal-processing unit 12 performs such processing that the image signal generated by the all-angle-of-view thinning-out read processing and the image signal generated by the all-pixel partially read processing are combined so to be output as the reproduction image signal DV5.

Figure 3:
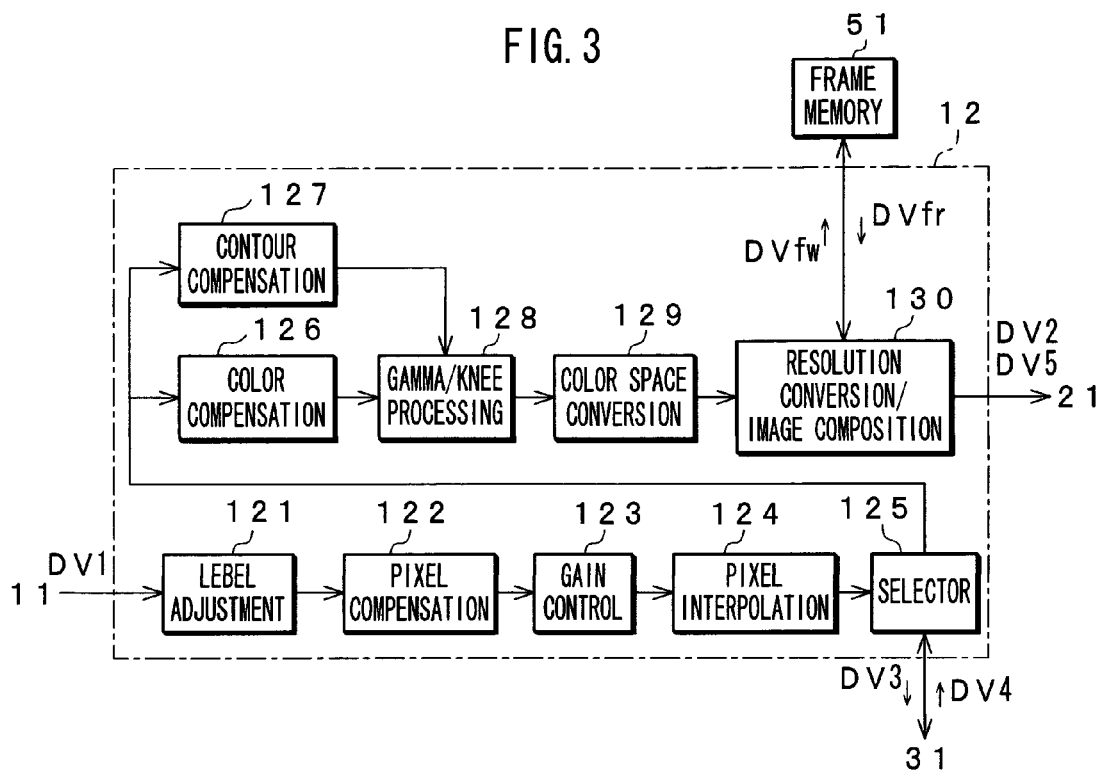
FIG. 3 is a block diagram showing a configuration of a camera-signal-processing unit.

FIG. 3 is a block diagram showing a configuration of the camera-signal-processing unit 12. A level adjustment portion 121 of the camera-signal-processing unit 12 adjusts the signal level of the image signal DV1 supplied from the image-capturing unit 11 for every color signal of red, green or blue. The level adjustment portion 121 sets a clamp, an off-set, a differential gain and the like by this signal level adjustment to carry out processing such as shading correction, flicker cancellation and the like.

A pixel compensation portion 122 performs pixel value compensation processing such as additive color mixing compensation and pixel defect compensation on the image signal processed in the level adjustment portion 121.

A gain control portion 123 corrects fluctuations in a signal level, which is generated by a change in the frame rate in the image sensor 111, to the image signal processed in the pixel compensation portion 122. Namely, if the frame rate is increased, a period of charge storage time in the image sensor 111 becomes shorter so that the signal level is lowered. Accordingly, the gain control portion 123 corrects the signal level so that, if the frame rate is changed, the signal levels before and after the change can be identical to each other.

A pixel interpolation portion 124 performs pixel interpolation only on the image signal generated by the all-angle-of-view thinning-out read processing and supplies the image signal to which the thinned-out pixels have been interpolated to a selector 125. In the pixel interpolation, for example, data for the thinned-out pixels is generated by a filtering process utilizing, for example, a correlation between the adjacent pixels. Since the image signal generated by the all-pixel partially read processing is not thinned out, it is supplied to the selector 125 without performing any pixel interpolation. Accordingly, if the pixel interpolation is performed only on the image signal generated by the all-angle-of-view thinning-out read processing, the all-angle-of-view thinning-out read processing is performed on a top frame within a period of reference frame time, so that an image displayed by the image signal of the top frame within the period of reference frame time has a resolution that is equal to that of the image capture in the standard image capture mode but becomes an image having reduced picture quality.

The selector 125 supplies the image signal, which has been supplied from the pixel interpolation portion 124, to a color compensation portion 126 and a contour compensation portion 127 when performing a monitor display using the image signal generated in the image-capturing unit 11. The selector 125 also outputs the image signal, which has been supplied from the pixel interpolation portion 124, to the image compression/decompression unit 31 shown in FIG. 1 when recording the image-captured picture on the recording media 42. The selector 125 further supplies the image signal DV4, which has been supplied from the image compression/decompression unit 31, to the color compensation portion 126 and the contour compensation portion 127 when performing any reproduction operations of the image-captured picture which has been recorded.

The color compensation portion 126 separates any low-frequency components from the image signal supplied through the selector 125 and performs color compensation such as linear matrix processing on the low-frequency components.

The contour compensation portion 127 separates any high-frequency components from the image signal supplied through the selector 125 and generates contour compensation data from the high-frequency components.

A gamma/knee processing portion 128 combines the contour compensation data generated in the contour compensation portion 127 with the image signal processed in the color compensation portion 126 and performs the gamma compensation, the knee processing and the like on the combined image signal.

A color space conversion portion 129 converts the image signal processed in the gamma/knee processing portion 128 to the image signal on a luminance signal and a color difference signal.

If the standard image capture mode is selected when the monitor display is performed using the image signal generated in the image-capturing unit 11, a resolution conversion/image composition portion 130 outputs the image signal on the luminance signal and the color difference signal, which are generated in the color space conversion portion 129, as the monitor image signal DV2 to the display-processing unit 21 or any external equipment, not shown.

Further, if the high-speed image capture mode is selected when the monitor display is performed, the resolution conversion/image composition portion 130 writes the image signal generated by performing the all-angle-of-view thinning-out read processing into a frame memory 51, reads the image signal thus written into the frame memory 51 within a period of reference frame time, and outputs it as the monitor image signal DV2 to the display-processing unit 21 or the like. If the image-captured picture recorded in the high-speed image capture mode is reproduced, the resolution conversion/image composition portion 130 further stores at least one of the image signal generated by performing the all-pixel partially read processing and the image signal generated by performing the all-angle-of-view thinning-out read processing, combines the image signal stored in the frame memory 51 with the other image signal, and outputs the combined image signal as the reproduction image signal DV5 to the display-processing unit 21 or any external equipment, not shown.

It is to be noted that the resolution conversion/image composition portion 130 converts a resolution of each of the monitor image signal DV2 and the reproduction image signal DV5 to be output to the display-processing unit 21 to one which is suitable for the display in the display unit 22 and outputs it. Further, the frame memory 51 is configured by using, for example, synchronous dynamic random access memory (SDRAM) or the like.

Figure 4:
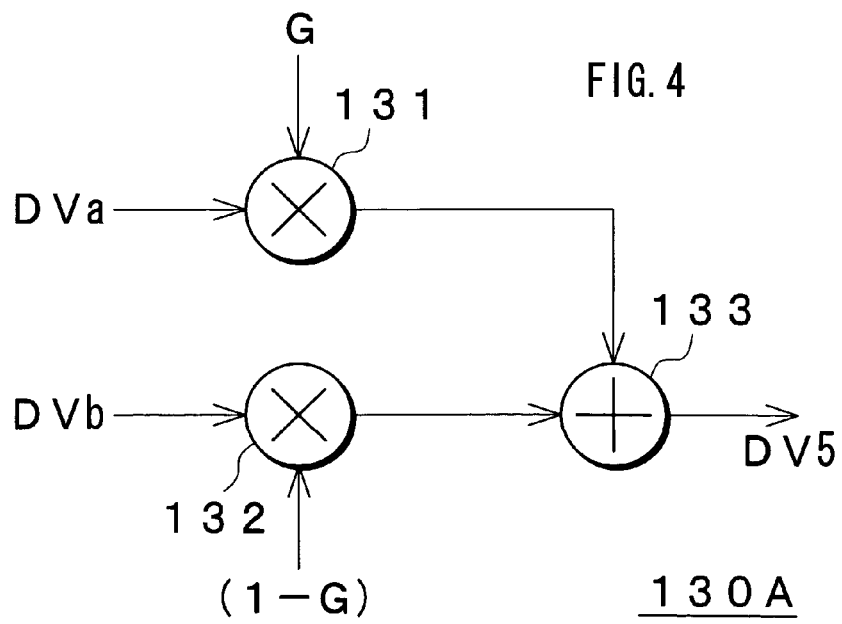
FIG. 4 is a block diagram showing a part of a configuration of a resolution conversion/image composition portion in the camera-signal-processing unit.

FIG. 4 is a block diagram showing a configuration of an image composition portion 130A, which performs image composition, in the resolution conversion/image composition portion 130. The image composition portion 130A supplies the image signal DVa by the all-pixel partially read processing to a multiplication circuit 131 and the image signal DVb by the all-angle-of-view thinning-out read processing to a multiplication circuit 132. The multiplication circuit 131 multiplies the image signal DVa by a gain G to supply a multiplication result G*DVa to an adder 133. The multiplication circuit 132 multiplies the image signal DVb by a gain (1−G) to supply a multiplication result (1−G)*DVb to the adder 133. The adder 133 adds these two multiplication results G*DVa, (1−G)*DVb to output the addition result as the reproduction image signal DV5.

Figure 5:
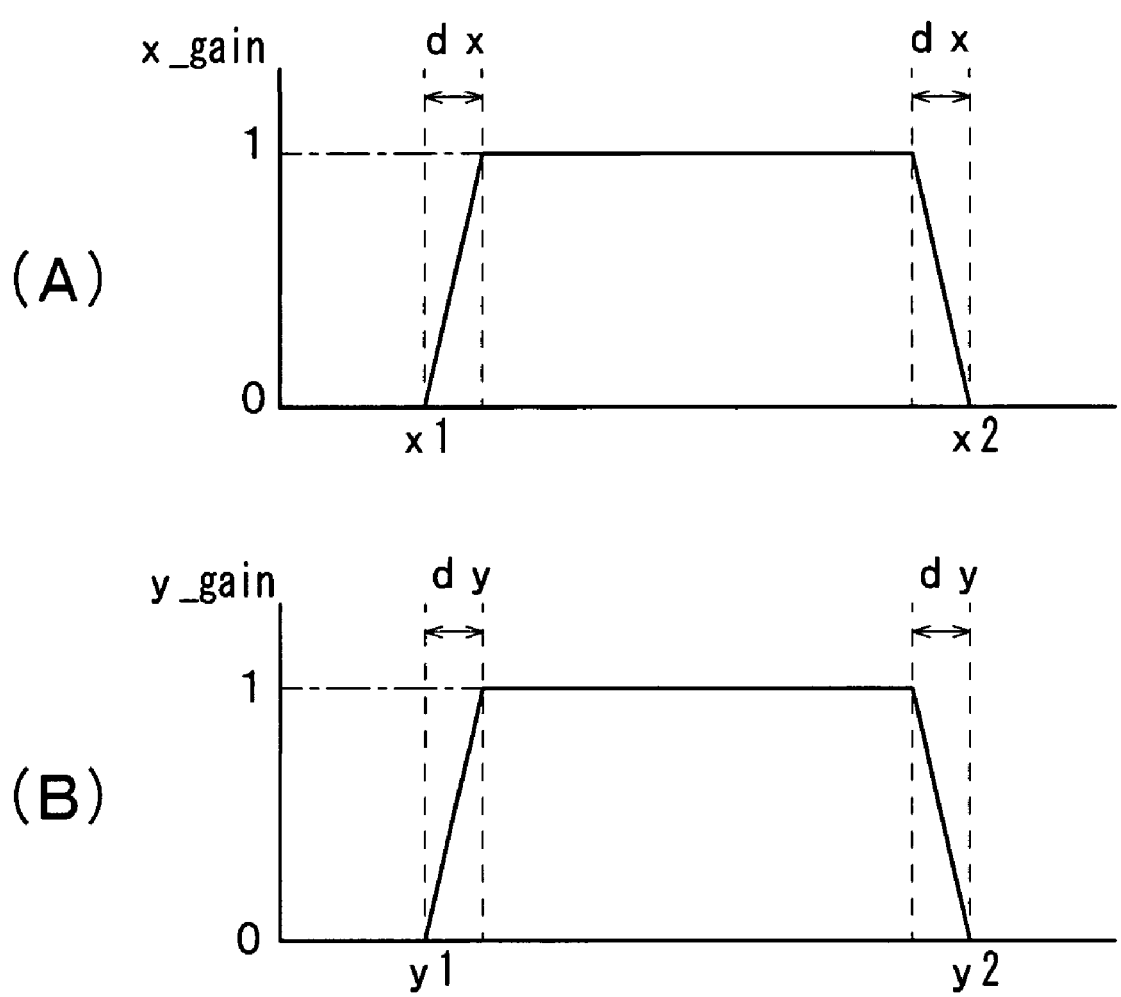
FIG. 5 are diagrams illustrating horizontal and vertical gains in the resolution conversion/image composition portion.

Further, the gain G is a multiplied value between a gain, x-gain on a horizontal direction coordinate as shown in FIG. 5 (A) and a gain, y-gain on a vertical direction coordinate as shown in FIG. 5 (B). Herein, it is supposed that horizontal boundaries in the image-captured picture by the all-pixel partially read are coordinates x1, x2 and vertical boundaries therein are coordinates y1, y2. It is to be noted that FIG. 6 illustrate a relationship of the image-captured picture and coordinates of the boundaries; FIG. 6 (A) illustrates the relationship of the image-captured picture by the all-pixel partially read and the coordinates of the boundaries; and FIG. 6 (B) illustrates relationship of the image-captured picture by the all-angle-of-view thinning-out read and the coordinates of the boundaries.

As shown in FIGS. 5 (A) and (B), boundary areas dx are set into inside directions of the image-captured picture by the all-pixel partially read from the coordinates x1, x2 indicating the boundaries of the image-captured picture by the all-pixel partially read and boundary areas dy are set into inside directions of the image-captured picture by the all-pixel partially read from the coordinates y1, y2. Further, the gain G is set so that the gain becomes zero at the coordinates x1, x2, y1, y2 and the gain is gradually increased from "zero" to "one" while positions are shifted to the boundary areas dx from the coordinates x1, x2 and to the boundary areas dy from the coordinates y1, y2. Thus, the image composition portion 130A can prevent any picture quality from being deteriorated by replacing the image-captured picture by the all-angle-of-view thinning-out read processing in which the pixel interpolation is carried out with the image-captured picture in the all-pixel partially read. The image composition portion 130A may also make unremarkable the boundaries between the image-captured picture by the all-pixel partially read processing and the image-captured picture by the all-angle-of-view thinning-out read processing in which the pixel interpolation is carried out.

The display unit 22 is connected to the display-processing unit 21. The display unit 22 is configured by using, for example, liquid crystal display (LCD) or the like. The display-processing unit 21 generates a display driving signal based on the monitor image signal DV2 and the reproduction image signal DV5 supplied from the camera-signal-processing unit 12 and the display unit 22 is driven by this display driving signal, thereby displaying the monitor image or the reproduction image on a screen of the display unit 22.

The image compression/decompression unit 31 performs data-compression on the image signal DV3 supplied from the camera-signal-processing unit 12 when recording the image-captured picture on the recording media 42 and supplies obtained coded data DW to a record/reproduction-processing unit 41. The image compression/decompression unit 31 also performs decode processing on the coded data DR supplied from the record/reproduction-processing unit 41 and supplies obtained image signal DV 4 to the camera-signal-processing unit 12.

When performing the data-compression on the image signal by the all-pixel and all-angle-of-view read processing and the image signal by the all-angle-of-view thinning-out read processing in which the pixel interpolation is carried out, the image compression/decompression unit 31 performs compression processing based on a coding system using a predictive coding, for example, a coding system of moving picture such as moving picture experts group (MPEG) to generate coded data stream of the moving picture. On the other hand, when performing the data-compression on the image signal by the all-pixel partially read processing, the image compression/decompression unit 31 performs compression processing based on a coding system without using any predictive coding, for example, a coding system of still picture such as joint photographic experts group (JPEG) to generate coded data of the still picture for every frame.

The image compression/decompression unit 31 also detects motion vectors MV for every macro block successively between frames code-processed by the coding system of moving picture and informs the control unit 61 of them. It is to be noted that if the coding processing is performed with MPEG, the image compression/decompression unit 31 separately detects the motion vectors MV only from an intra coded frame by utilizing the motion vectors MV detected at a time of this coding processing.

Figure 7:
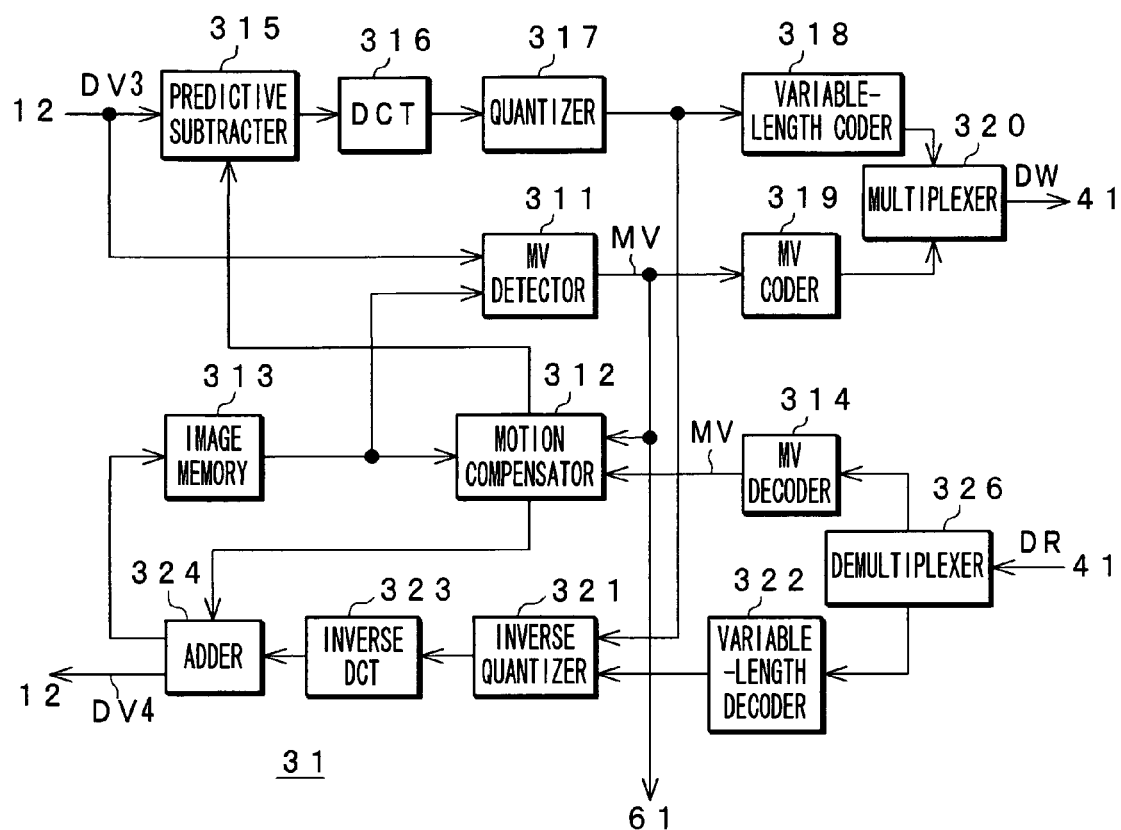
FIG. 7 is a diagram showing a configuration of an image compression/decompression unit.

FIG. 7 is a diagram showing a configuration of the image compression/decompression unit 31. The image signal DV3 supplied from the camera-signal-processing unit 12 is supplied to an MV detector 311 and a predictive subtracter 315 in the image compression/decompression unit 31. The MV detector 311 detects motion vectors MV successively between continuous frames from which the code data of the moving picture is generated using the image signal DV3 supplied from the camera-signal-processing unit 12. The MV detector 311 informs a motion compensator 312, an MV coder 319, and the control unit 61 of these detected motion vectors MV.

When coding the moving picture, the motion compensator 312 performs motion compensation on the image signal stored on an image memory 313 using the motion vectors MV detected in the MV detector 311 to generate a predictive value for coding. When decoding the moving picture, the motion compensator 312 also generates a predictive value for decoding in a similar way using the motion vectors MV decoded by an MV decoder 314.

When coding the moving picture, the predictive subtracter 315 subtracts the predictive value for coding, which is generated in the motion compensator 312, from the image signal DV3 supplied from the camera-signal-processing unit 12 and supplies a predictive error value, the subtraction result, to a DCT 316. When coding the still picture, the predictive subtracter 315 also supplies the image signal DV3 supplied from the camera-signal-processing unit 12 to the DCT 316 without any processing.

The DCT 316 performs two-dimensional discrete cosine conversion on output data from the predictive subtracter 315 and supplies coefficient data, this processed result, to a quantizer 317. The quantizer 317 performs a quantization processing on the coefficient data supplied from the DCT 316 and supplies obtained quantization data to a variable-length coder 318 and an inverse quantizer 321.

The variable-length coder 318 performs variable-length coding processing on the quantization data supplied from the quantizer 317. The MV coder 319 performs coding processing on the motion vectors MV obtained in the MV detector 311. A multiplexer 320 performs multiplication processing on the data obtained by performing the variable-length coding processing in the variable-length coder 318 and the data obtained by performing the coding processing in the MV coder 319 to supply it as coded data DW to the record/reproduction-processing unit 41.

When coding, the inverse quantizer 321 performs inverse quantization processing on the quantization data supplied from the quantizer 317 and supplies obtained coefficient data to an inverse DCT 323. When decoding, it performs an inverse quantization processing on the data obtained in a variable-length decoder 322 and supplies obtained coefficient data to the inverse DCT 323.

On the contrary of the DCT 316, the inverse DCT 323 performs inverse two-dimensional discrete cosine conversion on the coefficient data supplied from the inverse quantizer 321 and supplies obtained image signal to an adder 324.

The adder 324 adds the predictive value for coding or decoding supplied from the motion compensator 312 to the image signal supplied from the inverse DCT 323 and supplies the addition result as the image signal DV4 to the camera-signal-processing unit 12 and the image memory 313.

Accordingly, in this image compression/decompression unit 31, the predictive values are generated from the image signal thus coding-processed so far by the inverse quantizer 321, the inverse DCT 323, the adder 324, the image memory 313, and the motion compensator 312 and the predictive error values from this predictive values are successively processed in the DCT 316, the quantizer 317, and the variable-length coder 318, so that the image signal by the all-pixel and all-angle-of-view read and the image signal by the all-angle-of-view thinning-out read are coding-processed to the coded data of the moving picture. Alternatively, the image signal by the all-pixel partially read is directly input into the DCT 316, and processed in the DCT 316, the quantizer 317, and the variable-length coder 318 so to be coding-processed to the coded data of the still picture.

When decoding, a demultiplexer 326 separates the coded data DR supplied from the record/reproduction-processing unit 41 into a part of coefficient data and a part of the motion vector MV and supplies the part of the coefficient data to the variable-length decoder 322 and the part of the motion vector MV to the MV decoder 314. The MV decoder 314 performs decode processing on the data supplied from the demultiplexer 326 and supplies obtained motion vector to the motion compensator 312. The variable-length decoder 322 performs decoding on the data supplied from the demultiplexer 326 and supplies obtained coefficient data to the inverse quantizer 321.

The record/reproduction-processing unit 41 shown in FIG. 1 switches its operations under the control of the control unit 61 and performs processing for recording the coded data DW supplied from the image compression/decompression unit 31 on the recording media 42 or processing for reading desired coded data DR out of the recording media 42 and supply it to the mage compression/decompression unit 31. The recording media 42 are various kinds of mass recording medium such as hard disk device, optical disk device, and a memory card.

When recording the coded data DW on the recording media 42, the record/reproduction-processing unit 41 records it on the recording media 42 so that the coded data, on which the data compression is performed based on coding system of the moving picture, can be solely read out or successively read out along a time series together with coded data of the still picture corresponding to the moving picture. For example, when the record/reproduction-processing unit 41 uses MPEG format as a coding system of the moving picture, it is configured that the coded data has a hierarchical structure. It is to be noted that FIG. 8 illustrate the coded data of the moving picture and show a part of the hierarchical structure.

Figure 8:
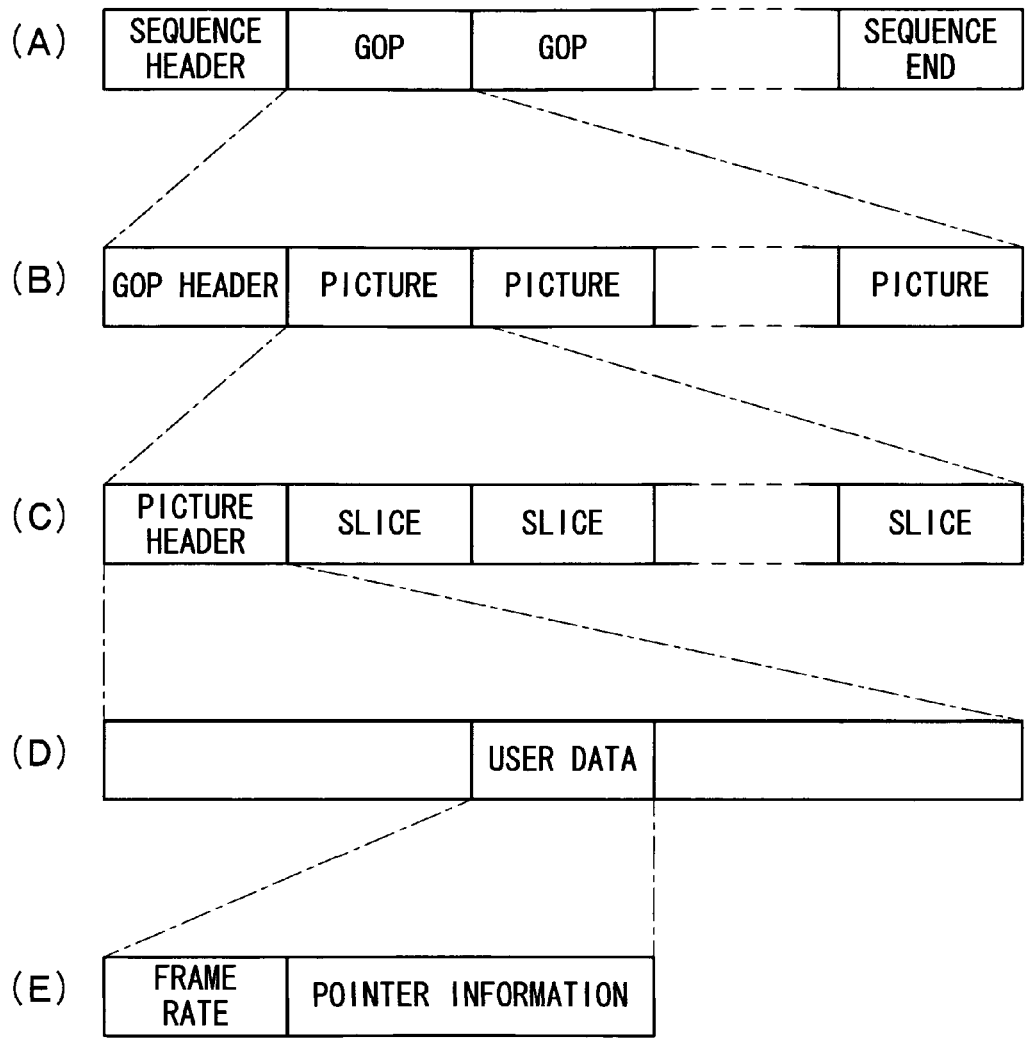
FIG. 8 are diagrams illustrating coded data of moving picture.

A sequence layer shown in FIG. 8 (A) is constituted of one GOP or more to which a sequence header and a sequence end are added. A GOP layer shown in FIG. 8 (B) is constituted of one picture or more to which a GOP header is added. A picture layer shown in FIG. 8 (C) is constituted of one slice or more to which a picture header is added.

The picture header of the picture layer indicates a start synchronization code of the picture layer, a number indicating a display order of the picture, information indicating a picture type, coding situation and the like. Further, as shown in FIG. 8 (D), it is configured that a user data region is provided, so that the user data can be set at a picture level. Thus, the record/reproduction-processing unit 41 inserts frame rate at the high-speed image capture mode and pointer information indicating recorded position of the corresponding still picture to the user data region as shown in FIG. 8 (E) to record them on the recording media 42. For example, if the frame rate at the high-speed image capture mode is twice the reference frame rate, the record/reproduction-processing unit 41 inserts, as the pointer information, the recorded position of the coded data in which the image signal by the all-pixel partially read processing generated during a period of reference frame time excluding the top frame within the period of reference frame time is coded as the image signal of the still picture, into the picture header of the picture indicating coded data of the image signal by the all-angle-of-view thinning-out read processing.

Thus, by inserting into the coded data of the moving picture the information indicating the recorded position of the corresponding still picture, the record/reproduction-processing unit 41 can read the coded data of the moving picture solely or the coded data of the still picture corresponding to the moving picture successively along a time series together with the coded data of the moving picture.

The control unit 61 controls operations of the entire image-capturing apparatus 10 and is a microcontroller constituted of a central processing unit (CPU), a read only memory (ROM), a random access memory (RAM) and the like. The control unit 61 carries out a program recorded on a memory, not shown, and controls operations of various parts in this image-capturing apparatus 10. The program is previously installed in this image-capturing apparatus 10 but may be recorded on recording medium such as an optical disk, a magnetic disk, a memory card, instead of the previous installation so as to be provided, or be provided by downloading it through a network of the Internet or the like. It is to be noted that the control unit 61 may perform processing in the image compression/decompression unit 31 and the like with software.

The control unit 61 controls the camera-signal-processing unit 12 and the display-processing unit 21 to perform the processing successively on the image signals generated in the image-capturing unit 11 to display a monitor image on a screen of the display unit 22. Further, when the user instructs the record of the image signal in this situation, the control unit 61 controls the camera-signal-processing unit 12 to supply the image signal DV3 to the image compression/decompression unit 31 where the data compression is performed, thereby recording the obtained coded data DW on the recording media 42. Further, when the user instructs the reproduction of the recording media 42, the control unit 61 controls the record/reproduction-processing unit 41 to read the desired coded data DR out of the recording media 42 and to supply it to the image compression/decompression unit 31. The control unit 61 also controls the camera-signal-processing unit 12 and the display-processing unit 21 to perform processing on the image signal DV4 obtained by performing data decompression processing in the image compression/decompression unit 31, and to display reproduced image on the screen of the display unit 22.

Further, the control unit 61 aggregates for each frame the motion vectors MV detected for every macro block in the image compression/decompression unit 31 and finds a motion vector which is determined that it indicates a motion of a subject, based on a result of the aggregation, thereby changing a position of a rectangular region to be read out of the image sensor 111 according to the all-pixel partially read by this motion vector. Specifically, the control unit 61 changes the position so that the rectangular region can contain a moving subject. It is to be noted that various kinds of aggregation methods such as a method of detecting a frequency distribution of the motion vectors and detecting a motion vector having a largest frequency distribution and a method of detecting motion vectors of parts in an object presenting any continuous motions by applying a method of following the object may be generally applied to this aggregation method of the motion vectors.

By the way, although the image-capturing unit 11, the camera-signal-processing unit 12, the image compression/decompression unit 31, the record/reproduction-processing unit 41 and the like have been integrally configured with the image-capturing apparatus 10 in the above-mentioned embodiment, the image-capturing unit 11 as well as the display-processing unit 21 and the display unit 22 may be separately provided to constitute a recording apparatus of an image signal and a reproducing apparatus thereof. Further, the camera-signal-processing unit 12 may be separately provided to constitute a recording apparatus for recording an image signal.

Figure 9:
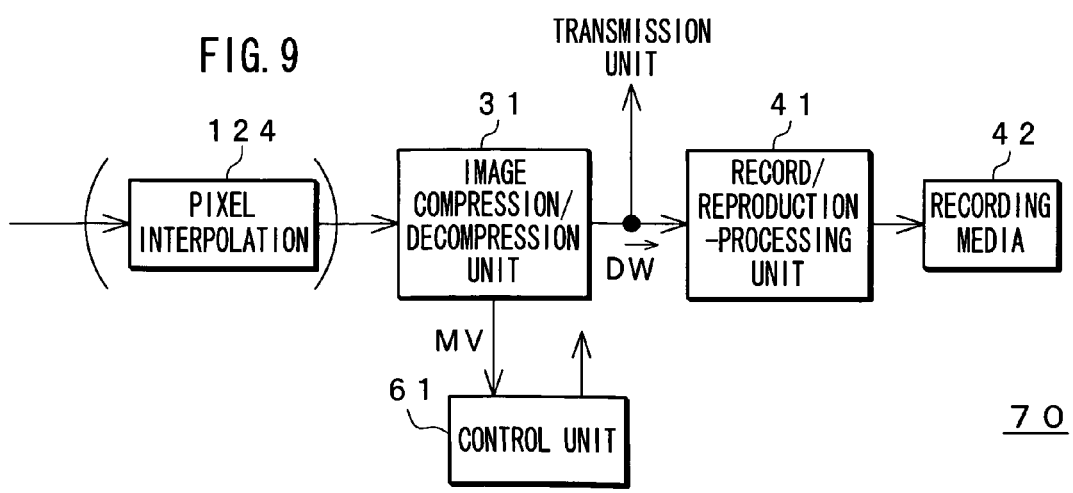
FIG. 9 is a block diagram showing a configuration of a recording apparatus.

FIG. 9 is a block diagram showing a configuration of a recording apparatus 70. It is to be noted that in FIG. 9, like numbers are applied to the corresponding members shown in FIGS. 1 and 3.

The recording apparatus 70 has the image compression/decompression unit 31 for performing compression processing on an image signal to generate coded data, the record/reproduction-processing unit 41 for recording coded data DW on recording media 42, and the control unit 61 for controlling operations of various parts.

In this recording apparatus 70, the image compression/decompression unit 31 performs compression processing on an image signal of an image-captured picture generated by allowing the image sensor 111 to switch in units of a set period of time between an all-angle-of-view thinning-out read processing in which a thinning-out read is performed on any pixels in an effective image area to generate the image signal and an all-pixel partially read processing in which all the pixels of a partial region of the effective image area are read out of the partial region to generate the image signal so as to generate coded data DW. Herein, the image compression/decompression unit 31 performs compression processing on the image signal obtained by performing the all-angle-of-view thinning-out read processing based on a coding system using predictive coding and performs compression processing on the image signal obtained by performing the all-pixel partially read processing based on a coding system without using the predictive coding.

Further, the image compression/decompression unit 31 cannot perform the compression processing efficiently if it performs the compression processing on the image signal of different thinning-out patterns based on a coding system using the predictive coding. Accordingly, if recording the image signal DV1 output from the image-capturing unit 11, the recording apparatus 70 is provided with the pixel interpolation portion 124, by which the thinned-out pixels are interpolated and then, supplied to the image compression/decompression unit 31, thereby enabling the compression processing to be efficiently performed.

The record/reproduction-processing unit 41 performs processing in which the coded data DW generated in the image compression/decompression unit 31 is written into the recording media 42.

It is to be noted that although the recording apparatus 70 shown in FIG. 9 shows a configuration, as shown in FIG. 1, of a case where the image signal before any color compensation, contour compensation, gamma/knee processing and the like have been performed is recorded, it may be configured so as to record the image signal after the color compensation, the contour compensation, the gamma/knee processing or the like are performed. Further, it may be provided with a transmission unit, from which the coded data DW generated in the image compression/decompression unit 31 is transmitted as a communication signal.

Figure 10:
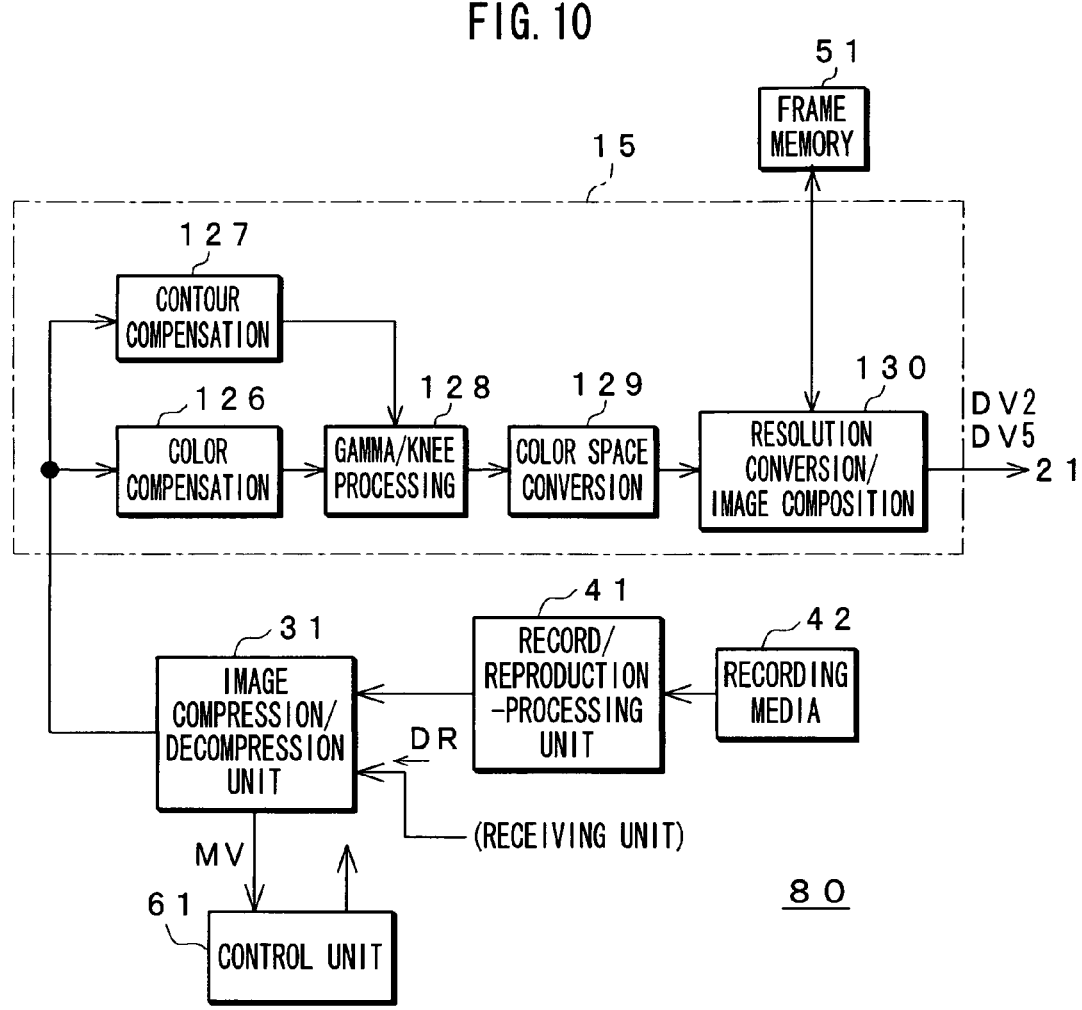
FIG. 10 is a block diagram showing a configuration of a reproducing apparatus.

FIG. 10 is a block diagram showing a configuration of a reproducing apparatus 80. It is to be noted that in FIG. 10, like numbers are applied to the corresponding members shown in FIGS. 1 and 3.

The reproducing apparatus 80 has the record/reproduction-processing unit 41 for reading the coded data DR out of the recording media 42, the image compression/decompression unit 31 for performing decompression processing on the read coded data, a data-processing unit 15 for performing processing on the image signal obtained by performing the decompression processing in the image compression/decompression unit 31 to generate reproduction image signal DV5, the frame memory 51, and the control unit 61 for controlling operations of various parts. Further, the data-processing unit 15 is constituted of the color compensation portion 126, the contour compensation portion 127, the gamma/knee processing portion 128, the color space conversion portion 129, and the resolution conversion/image composition portion 130.

In this reproducing apparatus 80, the record/reproduction-processing unit 41 performs read processing of coded data out of the recording media 42, namely, recording media on which after the image sensor 111 has switched in units of a set period of time between an all-angle-of-view thinning-out read processing in which a thinning-out read is performed on any pixels in an effective image area to generate an image signal and an all-pixel partially read processing in which all the pixels of a partial region of the effective image area are read out of the partial region to generate an image signal, the image signal obtained by performing the all-angle-of-view thinning-out read processing is compression-processed based on a coding system using predictive coding and recorded as the coded data and the image signal obtained by performing the all-pixel partially read processing is compression-processed based on a coding system without using the predictive coding and recorded as the coded data.

The image compression/decompression unit 31 decompresses the coded data read by the record/reproduction-processing unit 41 to generate the image signal.

The resolution conversion/image composition portion 130 in the data-processing unit 15 combines the image signal on which the pixel interpolation for the all-angle-of-view thinning-out read processing is performed and the image signal obtained by performing the all-pixel partially read processing, using the image signal generated in the image compression/decompression unit 31. Further, the record/reproduction-processing unit 41 reads the coded data compression-processed based on the coding system using the predictive coding out of the recording media 42 without reading the coded data compression-processed based on the coding system not using the predictive coding, and the image compression/decompression unit decompresses the coded data and outputs it as an image signal for every unit of a period of reference time.

It is to be noted that although the reproducing apparatus 80 shown in FIG. 10 shows a configuration of a case where the recording media on which the image signal before any color compensation, contour compensation, gamma/knee processing and the like have been performed is recorded is used, it may be configured to use recording media on which the image signal after the color compensation, the contour compensation, the gamma/knee processing or the like are performed is recorded. In this case, the image signal obtained by the decompression processing in the image compression/decompression unit 31 is supplied to the resolution conversion/image composition portion 130. Further, it may be provided with a receiving unit, by which the coded data is received and the image compression/decompression unit 31 may perform any decompression thereon.

The following will describe the generation operation of the image signal and the record/reproduction operation of the image signal. If an operation mode is set to the standard image capture mode by the user, the control unit 61 controls operation of the image-capturing unit 11 so that an image-captured picture of all the pixels and all the angle of views can be given at, for example, 60 (fps) from an effective image area AR in an image-capturing surface of the image sensor 111. The control unit 61 also controls operations of the camera-signal-processing unit 12 and the display-processing unit 21 so that the image-captured picture can be displayed on the display unit 22 at, for example, 60 (fps). Further, if recording on the recording media the image signal obtained by performing the image capture operation at the standard image capture mode, the control unit 61 controls the camera-signal-processing unit 12 to supply the image signal DV3 to the image compression/decompression unit 31 therefrom and the record/reproduction-processing unit 41 to record the coded data DW obtained by performing the data compression processing on the recording media 42. Further, if the user's manipulation for reproducing the recorded image signal is carried out, the control unit 61 controls the record/reproduction-processing unit 41 to read the coded data DR indicating desired image-captured picture out of the recording media 42 and supply it to the image compression/decompression unit 31. The control unit 61 also controls the image compression/decompression unit 31 to supply the image signal DV4 obtained by performing the data decompression processing on the coded data DR to the camera-signal-processing unit 12, thereby displaying the reproduced image on the display unit 22 or transmitting it to any external equipment.

Figure 11:
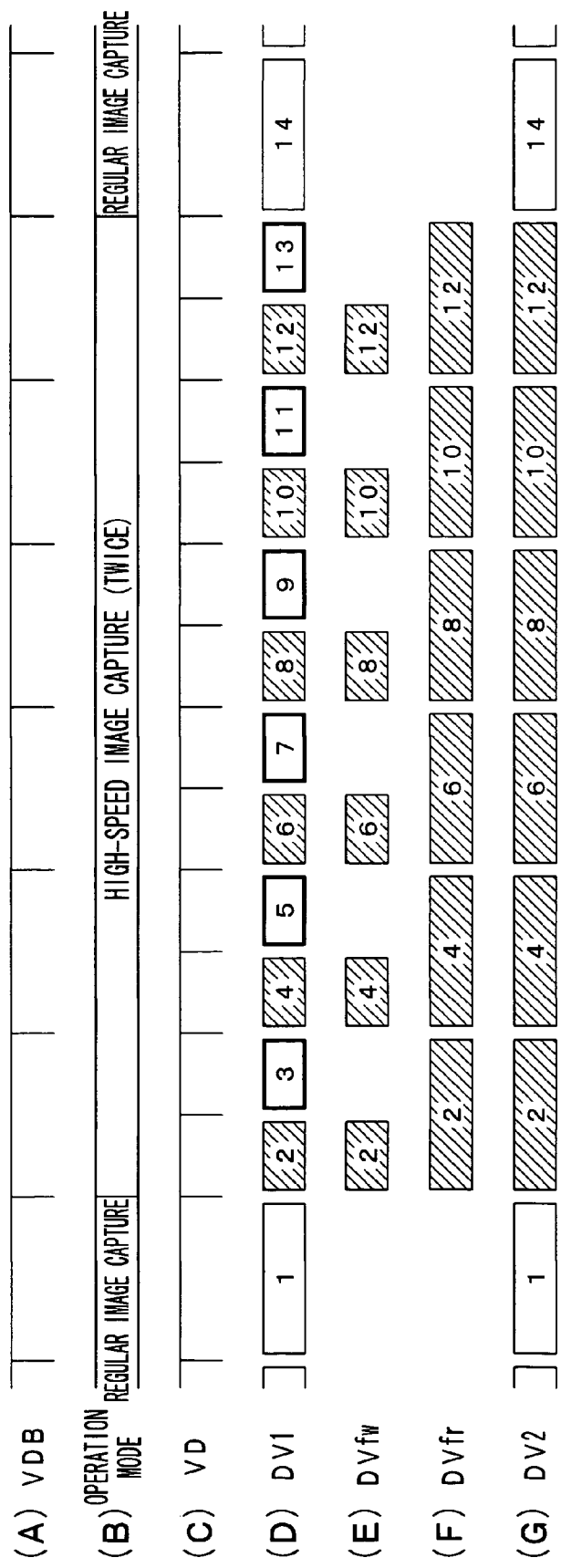
FIG. 11 are time diagrams of a case where a high-speed image capture is performed at a frame rate that is twice the reference frame rate.

The following will describe operation when the user switches the operation mode from the standard image capture mode to the high-speed image capture mode. FIG. 11 show the operation when a frame rate of the high-speed image capture mode is twice the reference frame rate that is a frame rate of the standard image capture mode.

FIG. 11 (A) shows a reference vertical synchronization signal VDB that is a timing signal within a period of reference frame time. Further, FIG. 11 (B) shows operation modes of the image-capturing apparatus 10. When the user switches the operation mode from the standard image capture mode to the high-speed image capture mode, the control unit 61 switches operations of the image-capturing unit 11, the camera-signal-processing unit 12, the image compression/decompression unit 31, the record/reproduction-processing unit 41 and the like from their standard image capture mode to their high-speed image capture mode at timing that is in synchronism with the reference vertical synchronization signal VDB. It is to be noted that FIG. 11 (C) shows a vertical synchronization signal VD that is a timing signal within a period of frame time in the high-speed image capture mode.

When the high-speed image capture mode is set, the image-capturing unit 11 outputs the image signal obtained by performing the all-angle-of-view thinning-out read processing at a top frame within the period of reference frame time and outputs the image signal obtained by performing the all-pixel partially read processing at the period of frame time excluding the top frame, as described above.

Therefore, the image signal DV1 output from the image-capturing unit 11 is constituted of the image signal (indicated by oblique lines) obtained by performing the all-angle-of-view thinning-out read processing at the top frame within the period of reference frame time and the image signal (indicated by a box with a heavy line) obtained by performing the all-pixel partially read processing at the period of frame time, the period of reference frame time excluding the top frame, as shown in FIG. 11 (D).

Herein, when performing a monitor display, the resolution conversion/image composition portion 130 of the camera-signal-processing unit 12 writes the image signal by the all-angle-of-view thinning-out read processing into the frame memory 51 and reads the image signal written into the frame memory 51 during the period of reference frame time, as described above. FIG. 11 (E) shows the image signal DVfw that is written into the frame memory 51 and FIG. 11 (F) shows the image signal DVfr that is read out of the frame memory 51. Thus, the resolution conversion/image composition portion 130 outputs the image signal by the all-angle-of-view thinning-out read processing, which has been read out of the frame memory 51 during the period of reference frame time, to the display-processing unit 21 and the like, as a monitor image signal DV2 shown in FIG. 11 (G), thereby enabling the image-captured picture to be displayed at a frame rate that is identical with that of the standard image capture mode.

Further, when the user performs an instruction of the record, the control unit 61 controls the pixel interpolation, coding processing and the like of the image signal DV1 shown in FIG. 11 (D) to record the coded data on the recording media 42.

Figure 12:
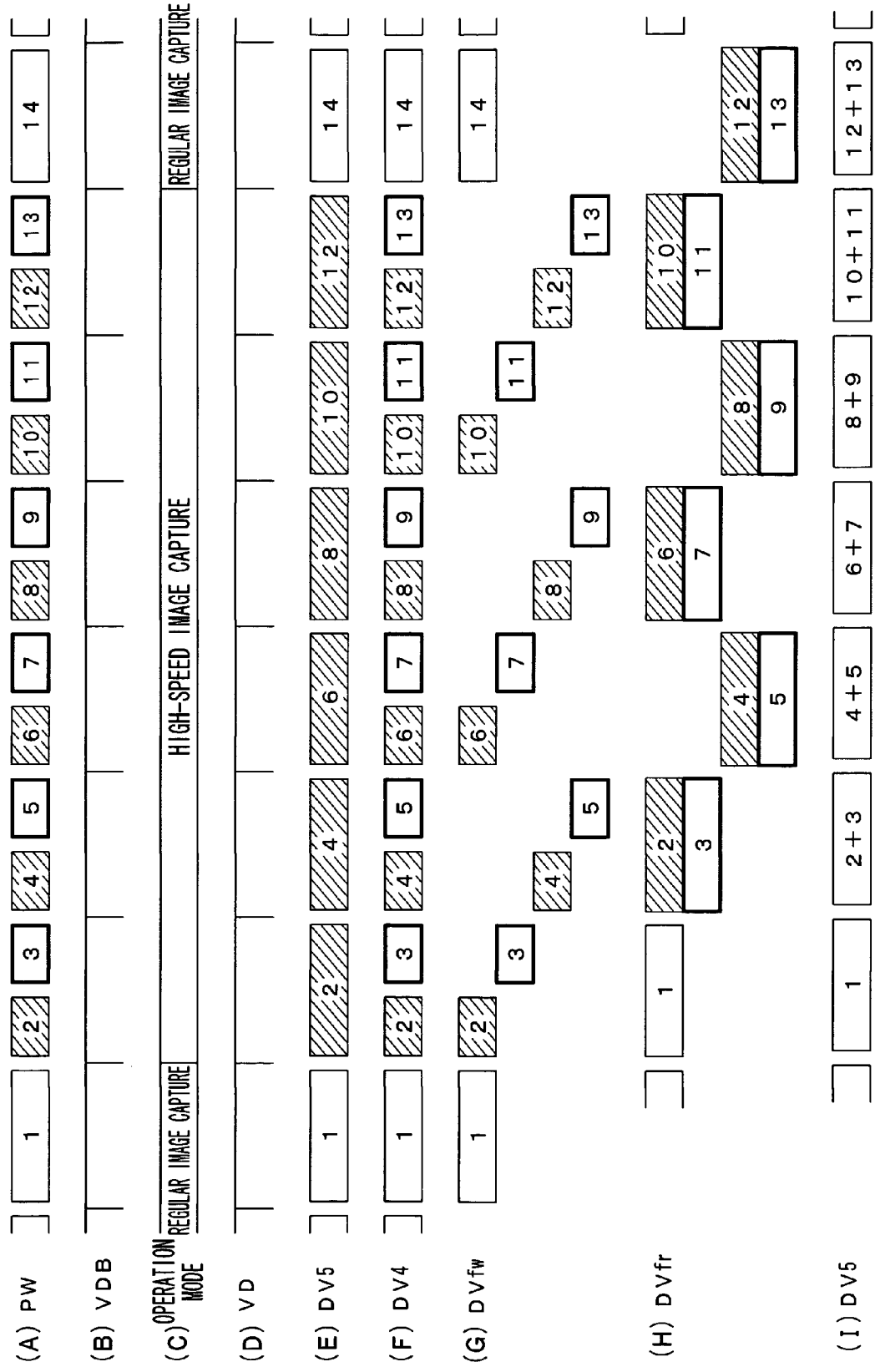
FIG. 12 are time diagrams of a case where an image obtained by performing the high-speed image capture at a frame rate that is twice the reference frame rate is reproduced at a regular reproduction rate.

The following will describe the reproduction operation of the image-captured picture recorded on the recording media 42 with reference to FIG. 12. FIG. 12 (A) shows frames PW of the image-captured picture coded and recorded on the recording media 42. When the recorded image-captured picture is reproduced at a reference frame rate and a frame rate of the high-speed image capture mode is twice the reference frame rate, the output image signal DV5 becomes an image signal relative to a slow reproduction image in which a motion of a subject is a half speed. Accordingly, the control unit 61 controls generation of the reproduction image signal DV5 in which the motion of the subject is same speed by using the recorded picture intermittently.

It is to be noted that FIG. 12 (B) shows a reference vertical synchronization signal VDB that is a timing signal within a period of reference frame time, FIG. 12 (C) shows operation modes of the image-capturing apparatus 10 when recording the image-captured picture, and FIG. 12 (D) shows a vertical synchronization signal VD.

When an image capture operation is performed at high-speed image capture mode, a top frame within the period of reference frame time contains the image signal by the all-angle-of-view thinning-out read processing. Accordingly, the control unit 61 controls reading the coded data in which the image signal by the all-angle-of-view thinning-out read processing is coded, namely, the coded data of the moving picture, out of the recording media 42 and performs decode processing on it to generate the image signal DV4 that is in synchronism with the vertical synchronization signal VD. At this time, the reproduction image signal DV5 output from the camera-signal-processing unit 12 becomes the image signal in which the motion of the subject is same speed, as shown in FIG. 12 (E).

Further, when the image compression/decompression unit 31 may perform decode processing on the coded data at a rate similar to that of the code processing and the frame memory 51 may store the image signal of plural frames, the control unit 61 may control combining the image signal by the all-angle-of-view thinning-out read processing with the image signal by the all-pixel partially read processing to generate the reproduction image signal DV5 in which the motion of the subject is same speed.

In this case, the control unit 61 controls reading the coded data out of the recording media 42 and performs decode processing on it to generate the image signal DV4 in frame order at the image capture time as shown in FIG. 12 (F).

Herein, in the resolution conversion/image composition portion 130 of the camera-signal-processing unit 12, the image signal by the all-angle-of-view thinning-out read processing and the image signal by the all-pixel partially read processing are written into the frame memory 51 and the image signals written into the frame memory 51 are read during the period of reference frame time to combine them. Further, it is configured that into the frame memory 51, the image signal by the all-angle-of-view thinning-out read processing and the image signal by the all-pixel partially read processing, which are read while the written image signals are read during the period of reference frame time and combined, are written. FIG. 12 (G) shows an image signal DVfw that is written into the frame memory 51 and FIG. 12 (H) shows an image signal DVfr that is read out of the frame memory 51. Further, FIG. 12 (I) shows an image signal DV5 that is output from the resolution conversion/image composition portion 130. When reaching a period of reproduction time of the image-captured picture recorded in the high-speed image capture mode, the resolution conversion/image composition portion 130 outputs an image signal of frame 2+3 in which the image signal of frame 2 that is an image signal by the all-angle-of-view thinning-out read processing and the image signal of frame 3 that is an image signal by the all-pixel partially read processing are combined. The resolution conversion/image composition portion 130 next outputs an image signal of frame 4+5 in which the image signal of frame 4 that is an image signal by the all-angle-of-view thinning-out read processing and the image signal of frame 5 that is an image signal by the all-pixel partially read processing are combined, and it outputs successively an image signal of frame . . . + . . . . Namely, the resolution conversion/image composition portion 130 can output an image signal of the image-captured picture in which the motion of the subject is same speed and deterioration in the picture quality is improved by the image signal by the all-pixel partially read processing.

Figure 13:
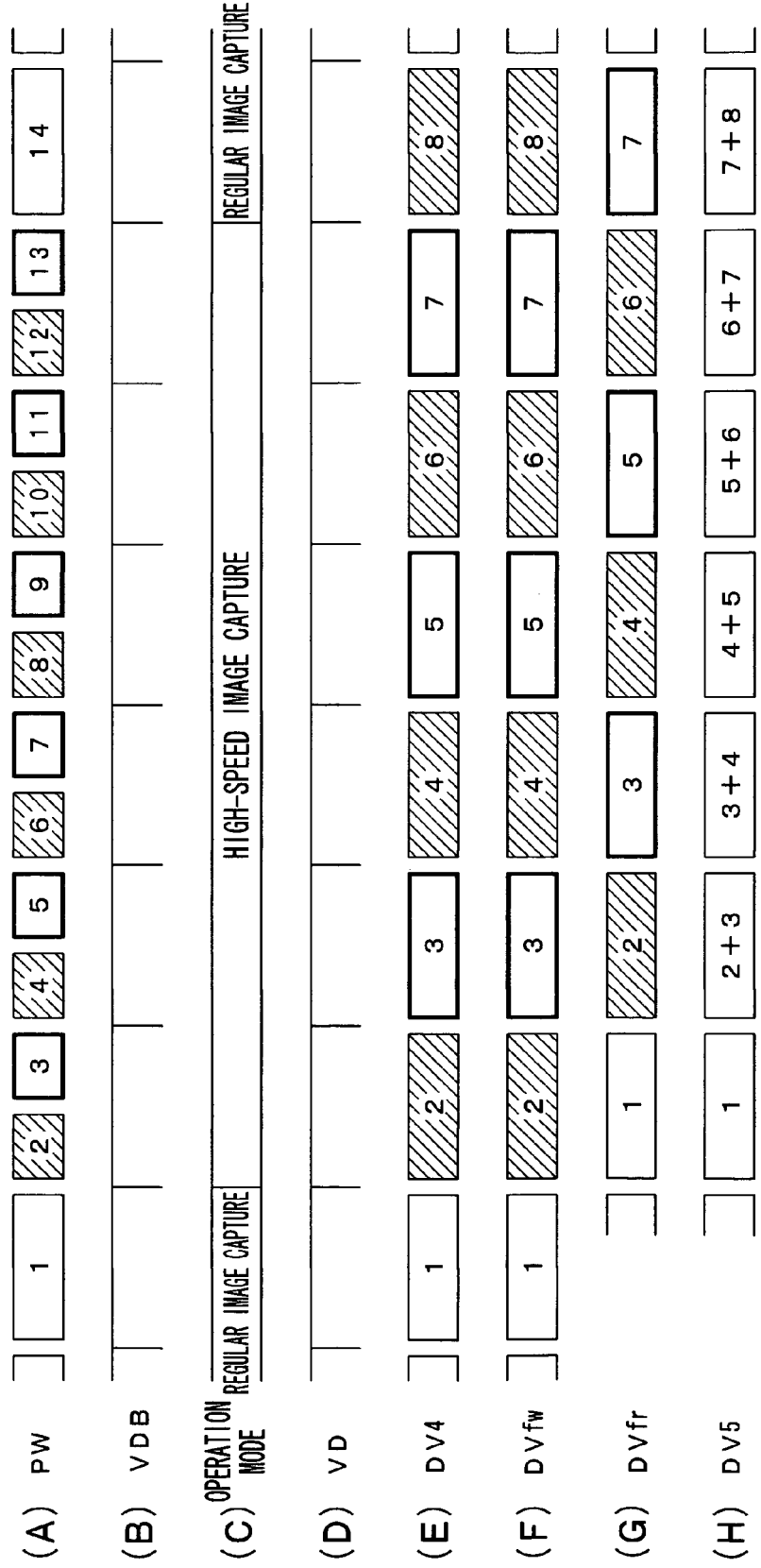
FIG. 13 are time diagrams of a case where an image obtained by performing the high-speed image capture at a frame rate that is twice the reference frame rate is reproduced in slow motion at a half reproduction rate.

FIG. 13 show a case where the reproduction image signal DV5 in which the motion of the subject is a half speed is generated by using the recorded image-captured pictures in frame order at the image capture time. It is to be noted that FIGS. 13 (A) through (D) correspond to FIGS. 12 (A) through (D).

In this case, the control unit 61 controls reading of items of the coded data from the recording media 42 successively and performs decode processing on them to generate the image signal DV4 of the reference frame rate. It is to be noted that FIG. 13 (E) shows the image signal DV4.

In the resolution conversion/image composition portion 130 of the camera-signal-processing unit 12, either the image signal by the all-angle-of-view thinning-out read processing or the image signal by the all-pixel partially read processing is written into the frame memory 51 and the image signal written into the frame memory 51 is read during the period of reference frame time. FIG. 13 (F) shows an image signal DVfw that is written into the frame memory 51 and FIG. 13 (G) shows an image signal DVfr that is read out of the frame memory 51.

Further, the resolution conversion/image composition portion 130 combines the image signal by the all-angle-of-view thinning-out read processing, which is read out of the frame memory 51, with the image signal by the all-pixel partially read processing, which is written into the frame memory 51, or the image signal by the all-pixel partially read processing, which is read out of the frame memory 51, with the image signal by the all-angle-of-view thinning-out read processing, which is written into the frame memory 51. FIG. 13 (H) shows the image signal DV5 output from the resolution conversion/image composition portion 130. When reaching a period of reproduction time of the image-captured picture recorded in the high-speed image capture mode, the resolution conversion/image composition portion 130 outputs an image signal of frame 2+3 in which the image signal of frame 2 that is an image signal by the all-angle-of-view thinning-out read processing and the image signal of frame 3 that is an image signal by the all-pixel partially read processing are combined. The resolution conversion/image composition portion 130 next outputs an image signal of frame 3+4 in which the image signal of frame 3 that is an image signal by the all-pixel partially read processing and the image signal of frame 4 that is an image signal by the all-angle-of-view thinning-out read processing are combined, and it outputs successively an image signal of frame . . . + . . . . Namely, the resolution conversion/image composition portion 130 can output an image signal of the reproduced picture in which the motion of the subject is a half speed and deterioration in the picture quality is prevented by the image signal by the all-pixel partially read processing. Further, it is also suitable to store only the image signal of one frame on the frame memory 51.

The following will describe operation when a frame rate of the high-speed image capture mode is triple that of the standard image capture mode.

Figure 14:
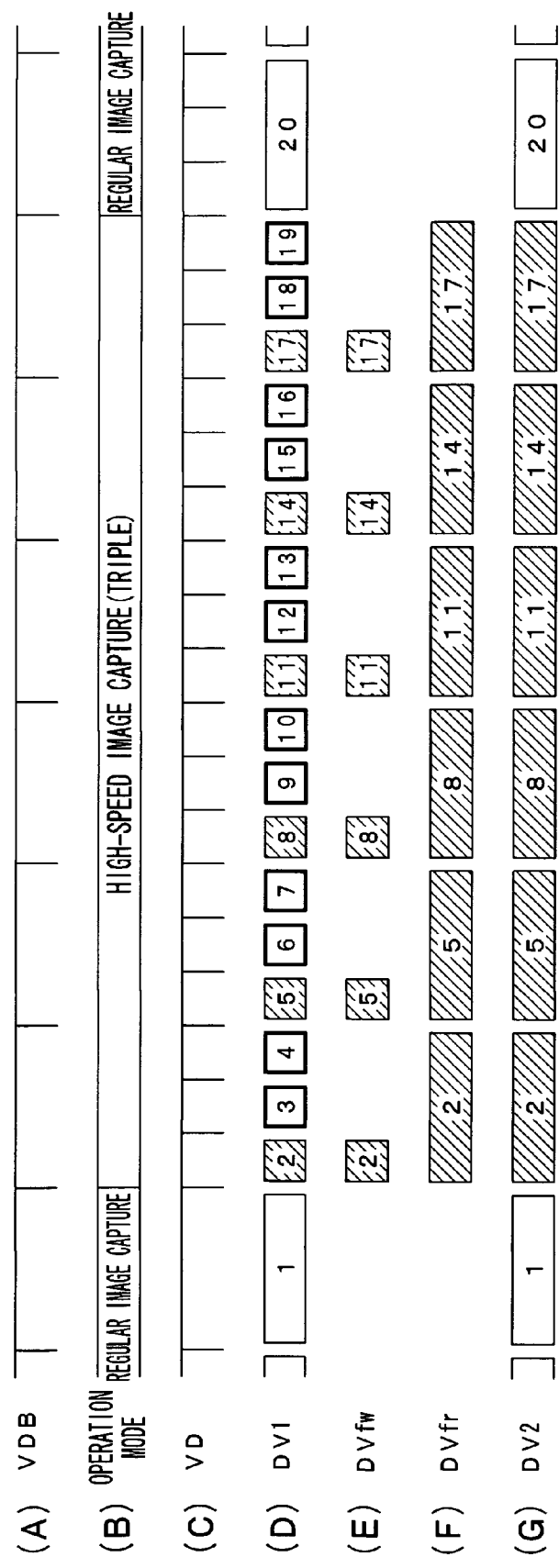
FIG. 14 are time diagrams of a case where a high-speed image capture is performed at a frame rate that is triple the reference frame rate.

FIG. 14 (A) shows a reference vertical synchronization signal VDB, FIG. 14 (B) shows operation modes of the image-capturing apparatus 10, and FIG. 14 (C) shows a vertical synchronization signal VD that is a timing signal within a period of frame time in the high-speed image capture mode.

When the high-speed image capture mode is set, the image-capturing unit 11 outputs the image signal obtained by performing the all-angle-of-view thinning-out read processing at a top frame within the period of reference frame time and outputs the image signal obtained by performing the all-pixel partially read processing at a period of two-frame time excluding the top frame, as described above.

Accordingly, the image signal DV1 output from the image-capturing unit 11 is constituted of the image signal (indicated by oblique lines) obtained by performing the all-angle-of-view thinning-out read processing at a top frame within the period of reference frame time and the image signals (indicated by boxes with heavy lines) obtained by performing the all-pixel partially read processing at the period of two-frame time excluding the top frame in the period of reference frame time, as shown in FIG. 14 (D).

Herein, when performing a monitor display, in the resolution conversion/image composition portion 130 of the camera-signal-processing unit 12, the image signal by the all-angle-of-view thinning-out read processing is written into the frame memory 51 and the image signal written into the frame memory 51 is read during the period of reference frame time, as described above. FIG. 14 (E) shows the image signal DVfw that is written into the frame memory 51 and FIG. 14 (F) shows the image signal DVfr that is read out of the frame memory 51. Thus, the resolution conversion/image composition portion 130 outputs the image signal by the all-angle-of-view thinning-out read processing, which has been read out of the frame memory 51 during the period of reference frame time, to the display-processing unit 21 and the like, as a monitor image signal DV2 shown in FIG. 14 (G), thereby enabling the image-captured picture to be displayed at a frame rate that is identical with that of the standard image capture mode.

Further, when the user performs an instruction of the record, the control unit 61 controls the pixel interpolation, coding processing and the like of the image signal DV1 shown in FIG. 14 (D) to record the coded data on the recording media 42.

Figure 15:
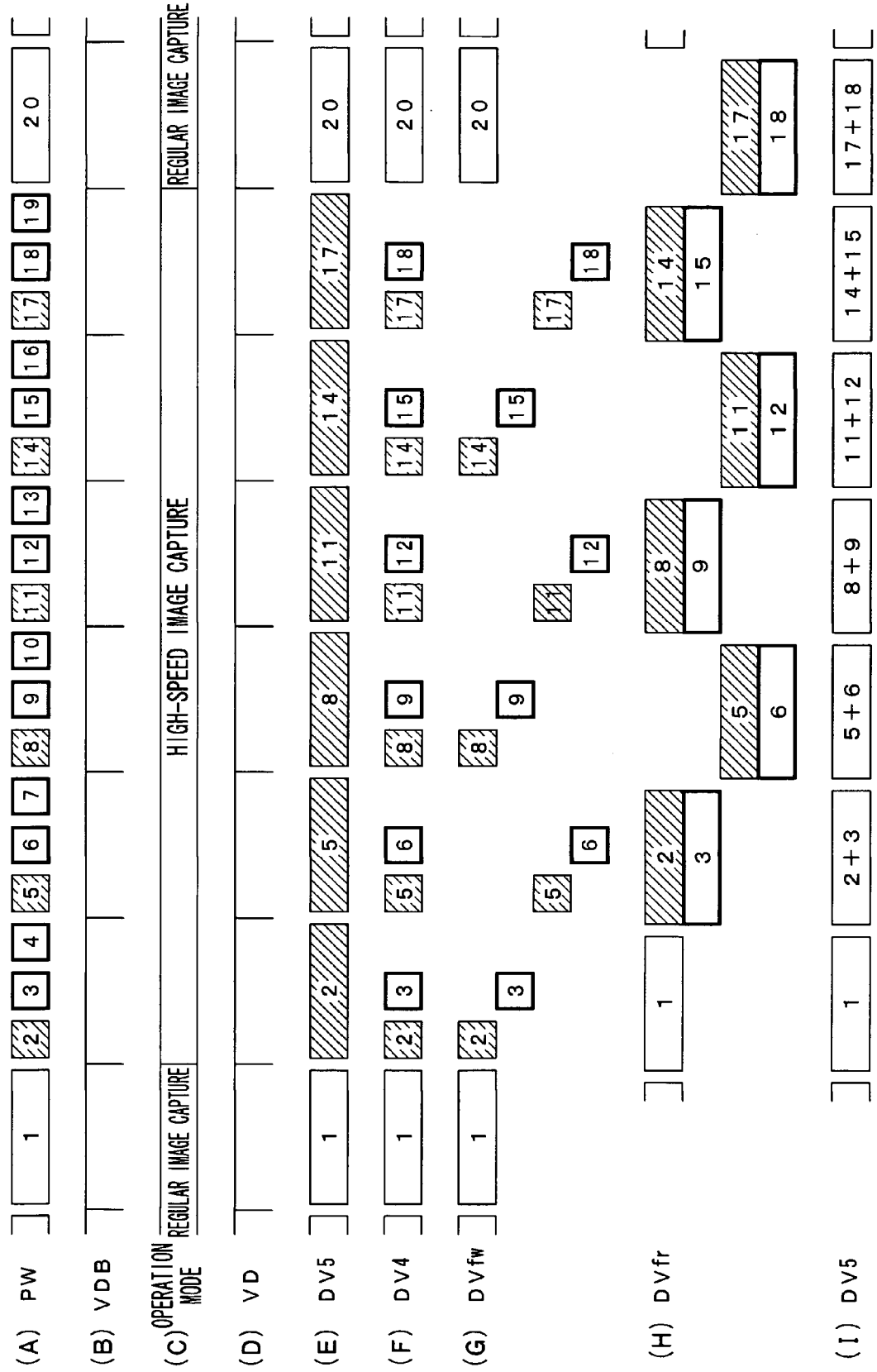
FIG. 15 are time diagrams of a case where an image obtained by performing the high-speed image capture at a frame rate that is triple the reference frame rate is reproduced at a regular reproduction rate.

The following will describe the reproduction operation of the image-captured picture recorded on the recording media 42 with reference to FIG. 15. FIG. 15 (A) shows frames PW of the image-captured picture coded and recorded on the recording media 42. When the recorded image-captured picture is reproduced at a reference frame rate and a frame rate of the high-speed image capture mode is triple the reference frame rate, the output image signal DV5 becomes an image signal relative to a slow reproduction image in which motion of a subject is one third speed. Therefore, the control unit 61 controls generation of the reproduction image signal DV5 in which the motion of the subject is same speed by using the recorded pictures intermittently.

It is to be noted that FIG. 15 (B) shows a reference vertical synchronization signal VDB that is a timing signal within a period of reference frame time, FIG. 15 (C) shows operation modes of the image-capturing apparatus 10 when recording the image-captured picture, and FIG. 15 (D) shows a vertical synchronization signal VD.

When an image capture operation is performed at high-speed image capture mode, a top frame within the period of reference frame time becomes one indicating the image signal by the all-angle-of-view thinning-out read processing. Accordingly, the control unit 61 controls reading of the coded data in which the image signal by the all-angle-of-view thinning-out read processing is coded, namely, the coded data of the moving picture, out of the recording media 42 and performs decode processing on it to generate the image signal DV4 that is in synchronism with the vertical synchronization signal VD. At this time, the reproduction image signal DV5 output from the camera-signal-processing unit 12 becomes the image signal in which the motion of the subject is same speed, as shown in FIG. 15 (E).

Further, when the image compression/decompression unit 31 may perform decode processing on the coded data at a rate similar to that of the code processing and the frame memory 51 may store the image signal of plural frames, the control unit 61 may control the combining of the image signal by the all-angle-of-view thinning-out read processing with the image signal by the all-pixel partially read processing to generate the reproduction image signal DV5 in which the motion of the subject is same speed.

In this case, the control unit 61 controls reading of the coded data from the recording media 42 and performs decode processing on it to generate the image signal DV4 as shown in FIG. 15 (F).

Herein, in the resolution conversion/image composition portion 130 of the camera-signal-processing unit 12, the image signal by the all-angle-of-view thinning-out read processing and the image signal by the all-pixel partially read processing are written into the frame memory 51 and the image signals written into the frame memory 51 are read during the period of reference frame time to combine them. Further, it is configured that into the frame memory 51, the image signal by the all-angle-of-view thinning-out read processing and the image signal by the all-pixel partially read processing, which are read while the written image signals are read during the period of reference frame time and combined, are written. FIG. 15 (G) shows an image signal DVfw that is written into the frame memory 51 and FIG. 15 (H) shows an image signal DVfr that is read out of the frame memory 51. Further, FIG. 15 (I) shows an image signal DV5 that is output from the resolution conversion/image composition portion 130. When reaching a period of reproduction time of the image-captured picture recorded in the high-speed image capture mode, the resolution conversion/image composition portion 130 outputs an image signal of frame 2+3 in which the image signal of frame 2 that is an image signal by the all-angle-of-view thinning-out read processing and the image signal of frame 3 that is an image signal by the all-pixel partially read processing are combined. The resolution conversion/image composition portion 130 next outputs an image signal of frame 5+6 in which the image signal of frame 5 that is an image signal by the all-angle-of-view thinning-out read processing and the image signal of frame 6 that is an image signal by the all-pixel partially read processing are combined, and it outputs successively an image signal of frame . . . + . . . . Namely, the resolution conversion/image composition portion 130 can output the image signal of the image-captured picture in which the motion of the subject is same speed and deterioration in the picture quality is improved by the image signal by the all-pixel partially read processing.

Further, if the image-captured picture recorded with the frame rate in the high-speed image capture mode being triple that of the standard image capture mode is read to generate the image signal DV4 in frame order at the image capture time and the image signal by the all-angle-of-view thinning-out read processing and the image signal by the all-pixel partially read processing are combined and output, the control unit 61 allows for displaying the reproduced image in which the motion of the subject is one third speed and the deterioration in the picture quality is prevented by the image signal by the all-pixel partially read processing. Further, if the slow motion reproduction is performed at a half reproduction speed, it is possible to deal with this by switching one third slow motion reproduction and a same speed reproduction alternatively, or the like.

The following will describe operation when a frame rate of the high-speed image capture mode is quadruple that of the standard image capture mode.

Figure 16:
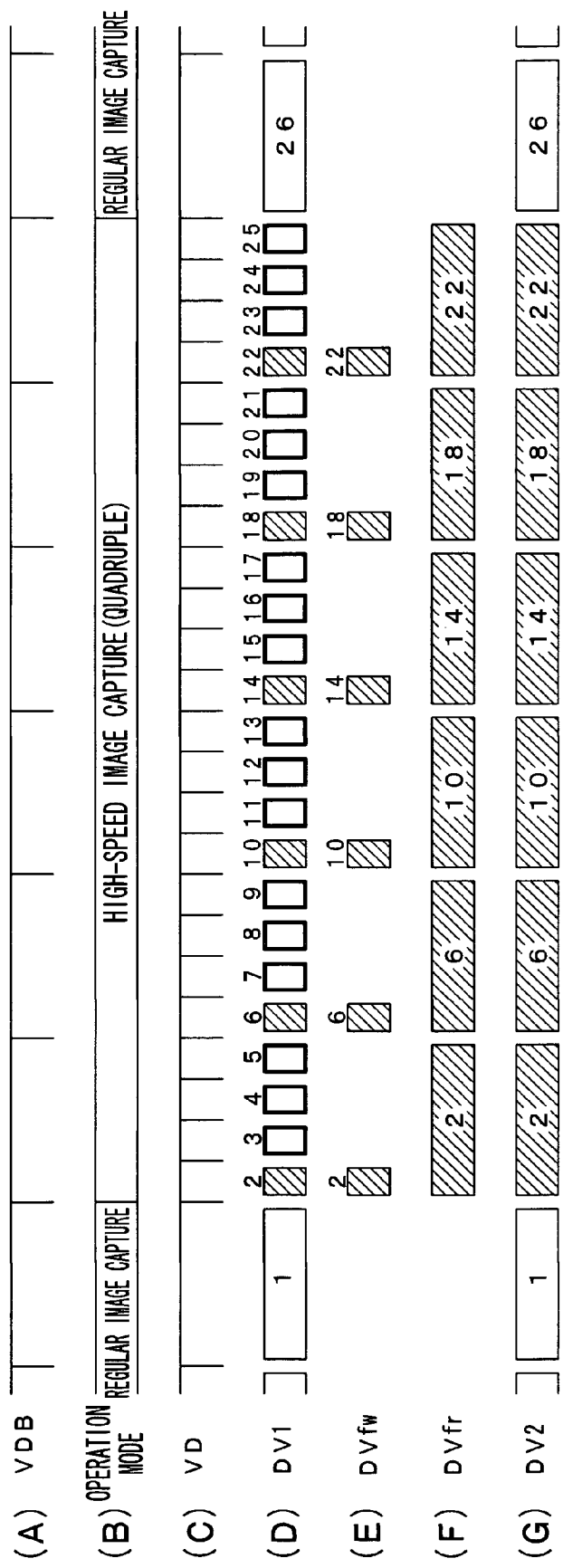
FIG. 16 are time diagrams of a case where a high-speed image capture is performed at a frame rate that is quadruple the reference frame rate.

FIG. 16 (A) shows a reference vertical synchronization signal VDB, FIG. 16 (B) shows operation modes of the image-capturing apparatus 10, and FIG. 16 (C) shows a vertical synchronization signal VD that is a timing signal within a period of frame time in the high-speed image capture mode.

When high-speed image capture mode is set, the image-capturing unit 11 outputs the image signal obtained by performing the all-angle-of-view thinning-out read processing at a top frame within the period of reference frame time and outputs the image signal obtained by performing the all-pixel partially read processing at a period of two-frame time excluding the top frame, as described above.

Therefore, the image signal DV1 output from the image-capturing unit 11 is constituted of the image signal (indicated by oblique lines) obtained by performing the all-angle-of-view thinning-out read processing at the top frame within the period of reference frame time and the image signals (indicated by boxes with heavy lines) obtained by performing the all-pixel partially read processing at the period of three-frame time excluding the top frame in the period of reference frame time, as shown in FIG. 16 (D).

Herein, when performing a monitor display, in the resolution conversion/image composition portion 130 of the camera-signal-processing unit 12, the image signal by the all-angle-of-view thinning-out read processing is written into the frame memory 51 and the image signal written into the frame memory 51 is read during the period of reference frame time, as described above. FIG. 16 (E) shows the image signal DVfw that is written into the frame memory 51 and FIG. 16 (F) shows the image signal DVfr that is read out of the frame memory 51. Thus, the resolution conversion/image composition portion 130 outputs the image signal by the all-angle-of-view thinning-out read processing, which has been read out of the frame memory 51 during the period of reference frame time, to the display-processing unit 21 and the like, as a monitor image signal DV2 shown in FIG. 16 (G), thereby enabling the image-captured picture to be displayed at a frame rate that is identical with that of the standard image capture mode.

Further, when the user performs an instruction of the record, the control unit 61 controls the pixel interpolation, coding processing and the like of the image signal DV1 shown in FIG. 16 (D) to record the coded data on the recording media 42

Figure 17:
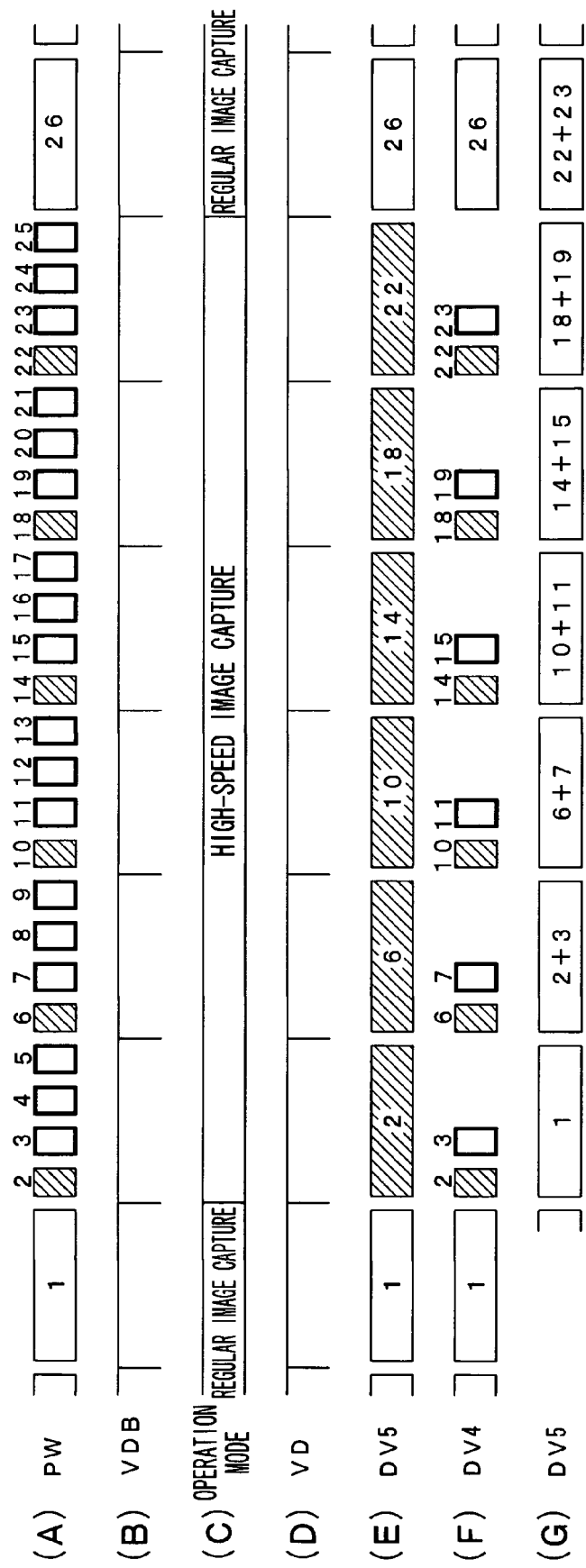
FIG. 17 are time diagrams of a case where an image obtained by performing the high-speed image capture at a frame rate that is quadruple the reference frame rate is reproduced at a regular reproduction rate.

The following will describe the reproduction operation of the image-captured picture recorded on the recording media 42 with reference to FIG. 17. FIG. 17 (A) shows frames PW of the image-captured picture coded and recorded on the recording media 42. When the recorded image-captured picture is reproduced at a reference frame rate and a frame rate of the high-speed image capture mode is quadruple the reference frame rate, the output image signal DV5 becomes a slow reproduction picture in which a motion of a subject is a quarter speed. Accordingly, the control unit 61 controls generation of the reproduction image signal DV5 in which the motion of the subject is same speed by using the recorded pictures intermittently.

It is to be noted that FIG. 17 (B) shows a reference vertical synchronization signal VDB that is a timing signal within a period of reference frame time, FIG. 17 (C) shows operation modes of the image-capturing apparatus 10 when recording the image-captured picture, and FIG. 17 (D) shows a vertical synchronization signal VD.

When an image capture operation is performed at high-speed image capture mode, the top frame within the period of reference frame time becomes one indicating the image signal by the all-angle-of-view thinning-out read processing. Accordingly, the control unit 61 controls reading of the coded data in which the image signal by the all-angle-of-view thinning-out read processing is coded, namely, the coded data of the moving picture, out of the recording media 42 and performs decode processing on it to generate the image signal DV4 that is in synchronism with the vertical synchronization signal VD. At this time, the reproduction image signal DV5 output from the camera-signal-processing unit 12 becomes the image signal of the reproduced picture in which the motion of the subject is same speed, as shown in FIG. 17 (E).

The control unit 61 may also combine the image signal by the all-angle-of-view thinning-out read processing with the image signal by the all-pixel partially read processing to generate the reproduction image signal DV5 in which the motion of the subject is same speed, as in a case where the frame rate is twice or triple the reference frame rate. FIG. 17 (F) shows the image signal DV4 generated by reading the coded data out of the recording media 42 and performing decode processing on it. FIG. 17 (G) also shows an image signal DV5 that is output from the resolution conversion/image composition portion 130.

Herein, when reaching a period of reproduction time of the image-captured picture recorded in the high-speed image capture mode, the resolution conversion/image composition portion 130 outputs an image signal of frame 2+3 in which the image signal of frame 2 that is an image signal by the all-angle-of-view thinning-out read processing and the image signal of frame 3 that is an image signal by the all-pixel partially read processing are combined. The resolution conversion/image composition portion 130 next outputs an image signal of frame 6+7 in which the image signal of frame 6 that is an image signal by the all-angle-of-view thinning-out read processing and the image signal of frame 7 that is an image signal by the all-pixel partially read processing are combined, and it outputs successively an image signal of frame . . . + . . . . Namely, the resolution conversion/image composition portion 130 can output the image signal of the reproduced picture in which the motion of the subject is same speed and deterioration in the picture quality is prevented by the image signal by the all-pixel partially read processing.

Figure 18:
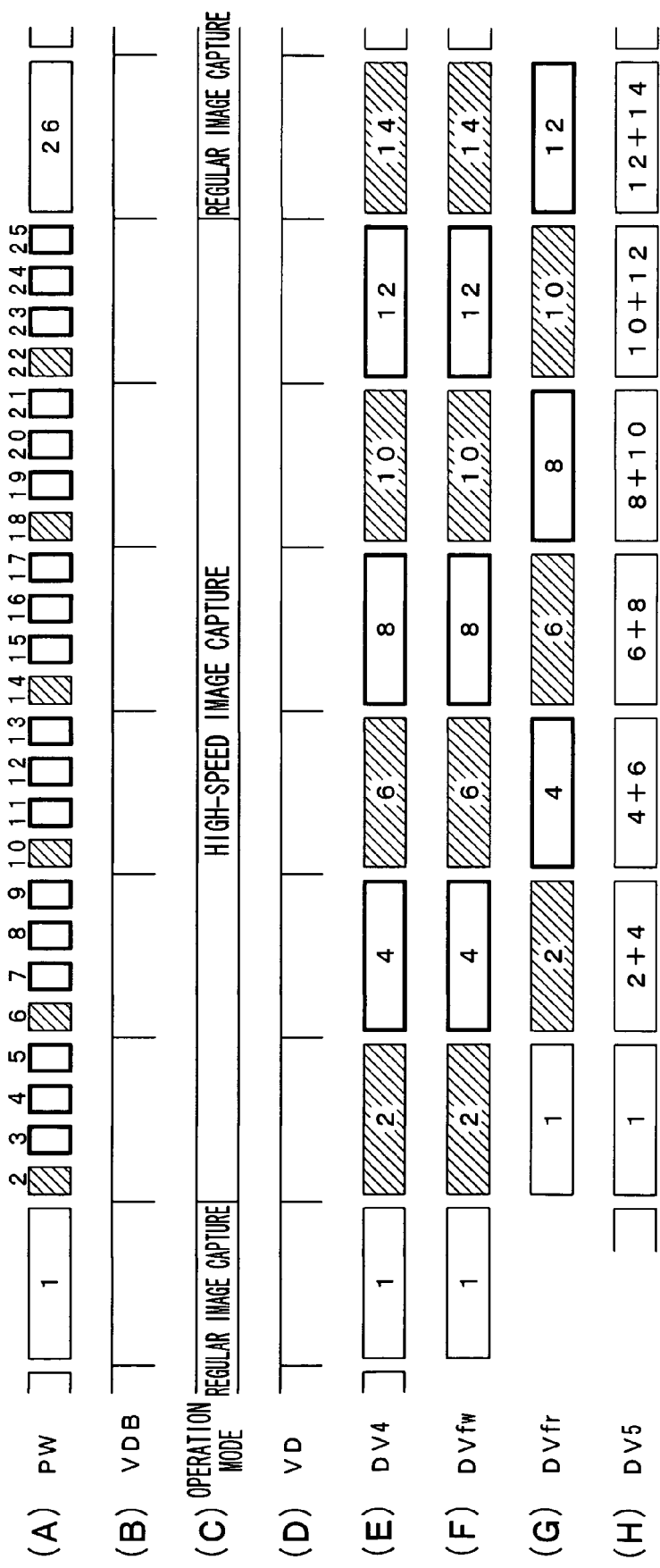
FIG. 18 are time diagrams of a case where an image obtained by performing the high-speed image capture at a frame rate that is quadruple the reference frame rate is reproduced in slow motion at a half reproduction rate.

FIG. 18 show a case where the reproduction image signal DV5 is generated in which the motion of the subject is a half speed. It is to be noted that FIGS. 18 (A) through (D) correspond to FIGS. 17 (A) through (D).

In this case, during the period of reproduction time of the image-captured picture recorded in the high-speed image capture mode, the control unit 61 controls reading of the coded data from the recording media 42 and performs decode processing on it to generate the image signal DV4 on every other frame. It is to be noted that FIG. 18 (E) shows the image signal DV4 obtained by the decode processing.

In the resolution conversion/image composition portion 130 of the camera-signal-processing unit 12, either the image signal obtained by performing the all-angle-of-view thinning-out read processing or the image signal obtained by performing the all-pixel partially read processing is written into the frame memory 51 and the image signal written into the frame memory 51 is read during the period of reference frame time. FIG. 18 (F) shows an image signal DVfw that is written into the frame memory 51 and FIG. 18 (G) shows an image signal DVfr that is read out of the frame memory 51.

Further, the resolution conversion/image composition portion 130 combines the image signal obtained by performing the all-angle-of-view thinning-out read processing, which is read out of the frame memory 51, with the image signal by the all-pixel partially read processing, which is written into the frame memory 51. Further, it combines the image signal by the all-pixel partially read processing, which is read out of the frame memory 51, with the image signal by the all-angle-of-view thinning-out read processing, which is written into the frame memory 51. FIG. 18 (H) shows the image signal DV5 output from the resolution conversion/image composition portion 130. When reaching a period of reproduction time of the image-captured picture recorded in the high-speed image capture mode, the resolution conversion/image composition portion 130 outputs an image signal of frame 2+4 in which the image signal of frame 2 that is an image signal by the all-angle-of-view thinning-out read processing and the image signal of frame 4 that is an image signal by the all-pixel partially read processing are combined. The resolution conversion/image composition portion 130 next outputs an image signal of frame 4+6 in which the image signal of frame 4 that is an image signal by the all-pixel partially read processing and the image signal of frame 6 that is an image signal by the all-angle-of-view thinning-out read processing are combined, and it outputs successively an image signal of frame . . . + . . . . Namely, the resolution conversion/image composition portion 130 can output an image signal of the reproduced picture in which the motion of the subject is a half speed and deterioration in the picture quality is prevented by the image signal by the all-pixel partially read processing.

Figure 19:
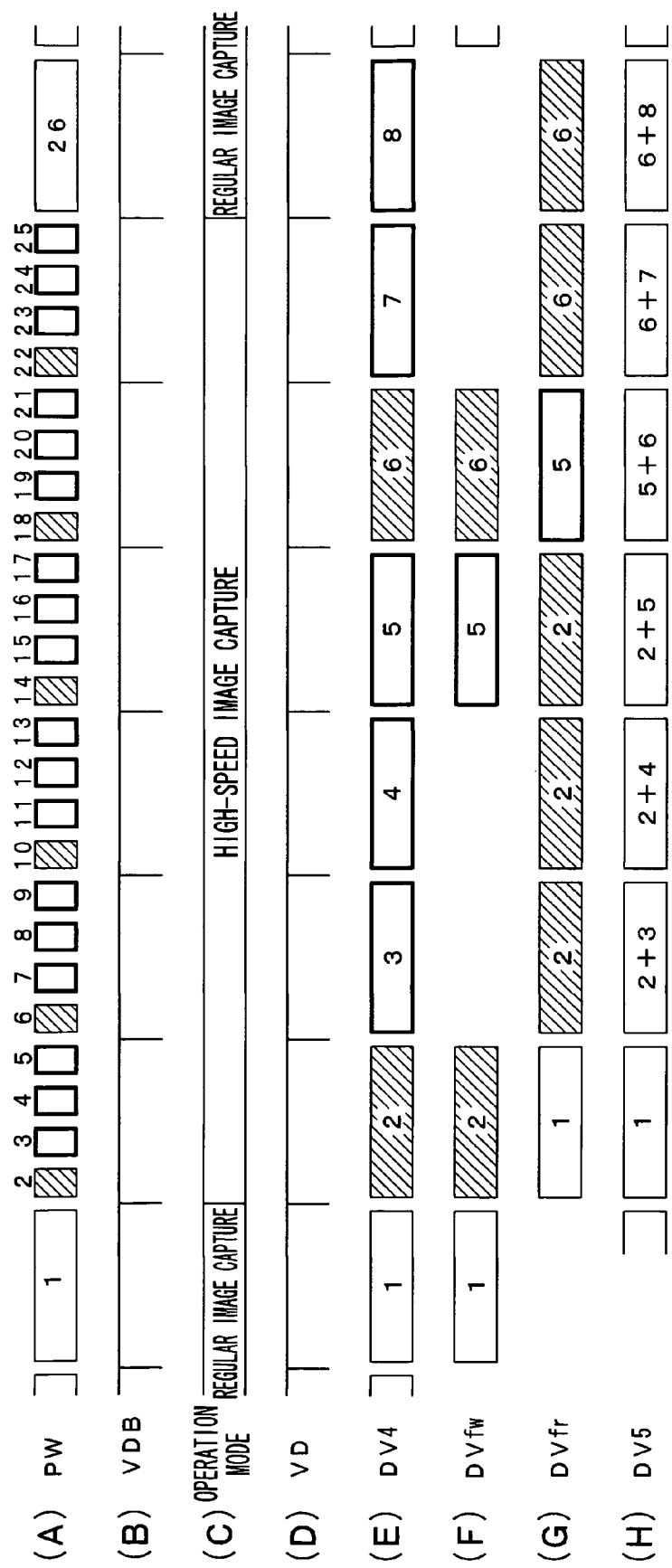
FIG. 19 are time diagrams of a case where an image obtained by performing the high-speed image capture at a frame rate that is quadruple the reference frame rate is reproduced in slow motion at a quarter reproduction rate.

FIG. 19 show a case where the reproduction image signal DV5 in which the motion of the subject is a quarter speed is generated by using the recorded image-captured pictures in frame order at the image capture time. It is to be noted that FIGS. 19 (A) through (D) correspond to FIGS. 17 (A) through (D).

In this case, during the period of reproduction time of the image-captured picture recorded in the high-speed image capture mode, the control unit 61 controls reading of the coded data from the recording media 42 and performs decode processing on it to generate the image signal DV4 indicating the image-captured pictures of the frame order. It is to be noted that FIG. 19 (E) shows the image signal DV4 obtained by performing the decode processing.

In the resolution conversion/image composition portion 130 of the camera-signal-processing unit 12, either the image signal obtained by performing the all-angle-of-view thinning-out read processing or the image signal obtained by performing the all-pixel partially read processing is written into the frame memory 51 and the image signal written into the frame memory 51 is read during the period of reference frame time. FIG. 19 (F) shows an image signal DVfw that is written into the frame memory 51 and FIG. 19 (G) shows an image signal DVfr that is read out of the frame memory 51.

Further, the resolution conversion/image composition portion 130 combines the image signal, which is read out of the frame memory 51, with the image signal, which is written into the frame memory 51, or the image signal by the all-angle-of-view thinning-out read processing, which is read out of the frame memory 51, with the image signal by the all-pixel partially read processing, which is obtained by performing the decode processing. FIG. 19 (H) shows the image signal DV5 output from the resolution conversion/image composition portion 130. When reaching a period of reproduction time of the image-captured picture recorded in the high-speed image capture mode, the resolution conversion/image composition portion 130 outputs an image signal of frame 2+3 in which the image signal of frame 2 that is an image signal by the all-angle-of-view thinning-out read processing and the image signal of frame 3 that is an image signal by the all-pixel partially read processing are combined. The resolution conversion/image composition portion 130 next outputs an image signal of frame 2+4 in which the image signal of frame 2 that is an image signal by the all-angle-of-view thinning-out read processing and the image signal of frame 4 that is an image signal by the all-pixel partially read processing are combined, an image signal of frame 2+5 in which the image signal of frame 2 that is an image signal by the all-angle-of-view thinning-out read processing and the image signal of frame 5 that is an image signal by the all-pixel partially read processing are combined, and an image signal of frame 5+6 in which the image signal of frame 5 that is an image signal by the all-pixel partially read processing and the image signal of frame 6 that is an image signal by the all-angle-of-view thinning-out read processing are combined, and it outputs successively an image signal of frame . . . + . . . . Namely, the resolution conversion/image composition portion 130 can output the image signal of the reproduced picture in which the motion of the subject is a quarter speed and deterioration in the picture quality is prevented by the image signal by the all-pixel partially read processing.

Further, if the reproduction speed is decelerated to perform a slow motion reproduction, it is possible to display the reproduced image in slow motion by performing the repeat processing of the composite image. Further, if the slow motion reproduction is performed at one third reproduction speed, it is possible to deal with this by switching slow motion processing at a half reproduction speed and slow motion processing at a quarter reproduction speed alternatively, or the like.

Thus, when the standard image capture mode is selected, the image-capturing unit 11 of the image-capturing apparatus 10 generates the image signal having the reference frame rate. The image-capturing apparatus 10 also performs processing for successively recording the image signal having this frame rate on the recording media 42 and processing for displaying the image-captured picture on the display unit 22 at the reference frame rate.

Further, when the high-speed image capture mode is selected, the image-capturing unit 11 of the image-capturing apparatus 10 generates the image signal by the all-angle-of-view thinning-out read processing at the top frame within the period of reference frame time and the image signal by the all-pixel partially read processing in the period of reference frame time excluding the top frame. Therefore, if an image display is performed using the image signal of the top frame within the period of reference frame time, the image-captured picture can be displayed at the reference frame rate in spite of the frame rate in the high-speed image capture mode.

Further, the top frame within the period of reference frame time contains the image signal by the all-angle-of-view thinning-out read processing so that the image-capturing apparatus 10 performs pixel interpolation on the image signal by the all-angle-of-view thinning-out read processing. Accordingly, by displaying the image-captured pictures by successively using the image signals of only the top frame within the period of reference frame time, on which the pixel interpolation is performed, the image-captured picture having the same number of pixels as that of the standard image capture mode can be displayed on the display unit 22 even if the high-speed image capture mode is selected.

Further, the resolution conversion/image composition portion 130 combines the image signal obtained by performing the all-angle-of-view thinning-out read processing with the image signal obtained by performing the all-pixel partially read processing and outputs it. Thus, the image-capturing apparatus 10 may compensate for deterioration in the picture quality generated by performing the all-angle-of-view thinning-out read processing with the image-captured picture obtained by performing the all-pixel partially read processing.

Further, the image-capturing apparatus 10 and the recording apparatus 70 record on the recording media 42 the image signal obtained by performing the all-angle-of-view thinning-out read processing as the coded data of moving picture and the image signal obtained by performing the all-pixel partially read processing as the coded data of still picture. Therefore, the image-capturing apparatus 10 and the reproducing apparatus 80 read the coded data on which the compression processing is performed based on a coding system using predictive coding, without reading the coded data on which the compression processing is performed based on a coding system without using the predictive coding, and reproduce it. Namely, if only the coded data of the moving picture is read without reading the coded data of the still picture and any decode processing is performed on it, it is possible to obtain the image signal, in which the motion of the subject is same speed, having a frame rate that is identical with that of the standard image capture mode easily. Further, the image-capturing apparatus 10 and the reproducing apparatus 80 reproduce the coded data of the moving picture and the coded data of the still picture corresponding to the reproduction speed and combine the reproduced image signals, thereby enabling an image signal having less deterioration in the picture quality to be output at a desired reproduction speed. In other words, by processing the coded data of motion picture every time to perform the reproduction, it is possible to output the image signal in which the motion of the subject is same speed. Further, by reproducing the coded data of the still picture corresponding to the reproduction speed and combining the image signals, it is possible to easily obtain a slow motion image in which the motion of the subject is slower than the same speed.

Further, in the image-capturing apparatus 10, since it is not necessary to perform such processing that the image signal of high speed is temporarily stored in a memory and then, is again recorded on mass recording medium, as any conventional image-capturing apparatus, a period of time for image capture at high speed is not limited by a capacity of the memory, thereby enabling the image capture at high speed to be realized without missing any precious chance of image capture.

Further, in the all-angle-of-view thinning-out read processing, an interval between the thinning-out reads is made extended if the frame rate becomes higher (a unit of a set period of time is shortened). Further, in the all-pixel partially read processing, a region from which the pixels should be read is made limited if the frame rate becomes higher. Thus, the pixels to be read are made decreased if the frame rate becomes higher, so that a number of the pixels to be read during the period of reference frame time can be kept fixed. Namely, even if the frame rate is higher in the high-speed image capture mode, it is possible to prevent an amount of signal from being increased and to realize the high-speed image capture suitably.

Further, in the all-angle-of-view thinning-out read processing, if the frame rate becomes lower (a unit of a set period of time is extended) in the high-speed image capture mode in a case of a higher frame rate than that of the standard image capture mode, an interval between the thinning-out reads is made shortened. Further, in the all-pixel partially read processing, a region from which the pixels should be read is made extended if the frame rate becomes lower. Thus, it is configured that when the frame rate is low in the high-speed image capture mode, a larger number of the pixels are read as compared with a case of high frame rate in the high-speed image capture mode, thereby enabling a number of pixels to be read during the period of reference frame time to be kept fixed.

Figure 20:
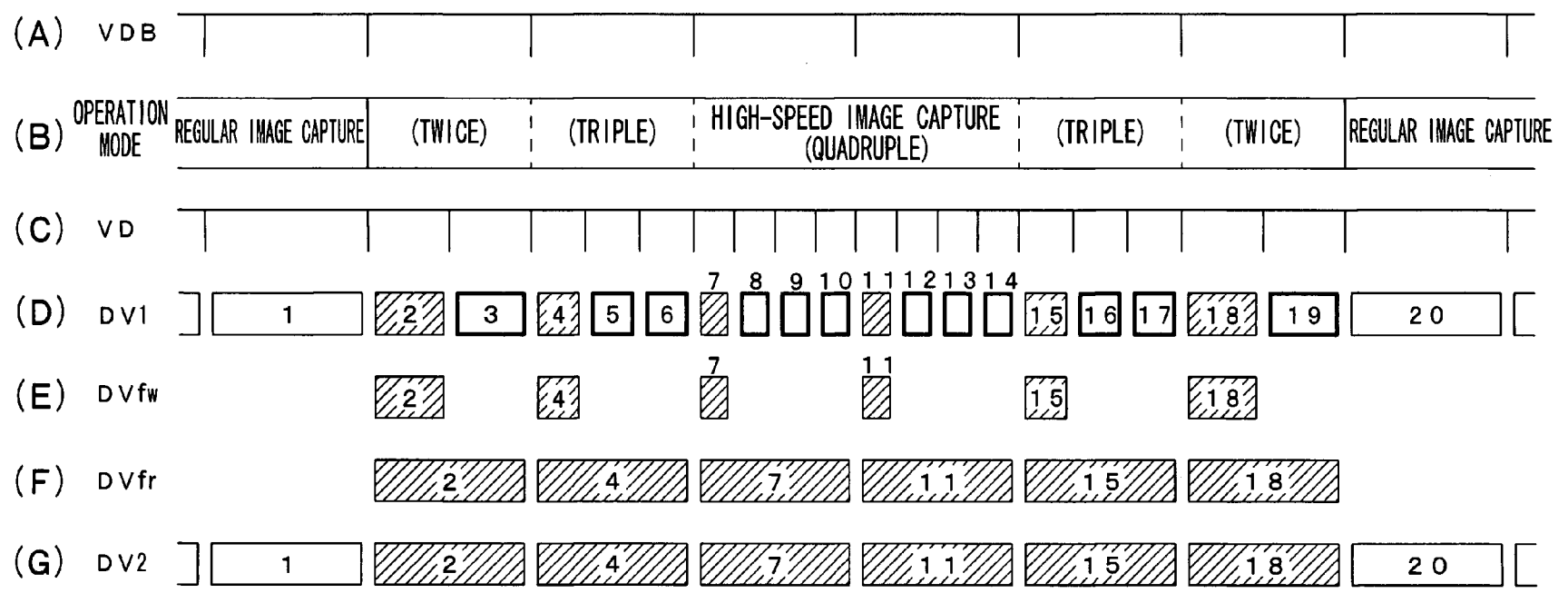

By the way, although the case where the frame rate in the high-speed image capture mode is fixed has been described in the above-mentioned embodiments, the frame rate in the high-speed image capture mode may be variable. It is to be noted that if the frame rate is variable, it may vary to not only 120 (fps), 180 (fps), and 240 (fps) but also 60 (fps) that is the frame rate in the standard image capture mode. FIG. 20 show operation in a case where the user specifies frame rates successively and the user changes the frame rates in order of 60 (fps)→120 (fps)→180 (fps)→240 (fps)→180 (fps)→120 (fps)→60 (fps). It is to be noted that FIG. 20 (A) shows a reference vertical synchronization signal VDB, FIG. 20 (B) shows operation modes of the image-capturing apparatus 10, and FIG. 20 (C) shows a vertical synchronization signal VD.

When the high-speed image capture mode is set, the image-capturing unit 11 outputs the image signal obtained by performing the all-angle-of-view thinning-out read processing at the top frame within the period of reference frame time and outputs the image signal obtained by performing the all-pixel partially read processing at a period of reference frame time excluding the top frame.

Therefore, the image signal DV1 output from the image-capturing unit 11 is constituted of the image signal (indicated by oblique lines) obtained by performing the all-angle-of-view thinning-out read processing at the top frame within the period of reference frame time and the image signals (indicated by boxes with heavy lines) obtained by performing the all-pixel partially read processing at the periods of frame time excluding the top frame within the period of reference frame time, as shown in FIG. 20 (D).

Herein, when performing a monitor display, the image-capturing apparatus 10 and the reproducing apparatus 80 write the image signal obtained by performing the all-angle-of-view thinning-out read processing into the frame memory 51 and reads the image signal written into the frame memory 51 during the period of reference frame time, as described above. FIG. 20 (E) shows the image signal DVfw that is written into the frame memory 51 and FIG. 20 (F) shows the image signal DVfr that is read out of the frame memory 51. Thus, the image-capturing apparatus 10 and the reproducing apparatus 80 outputs the image signal by the all-angle-of-view thinning-out read processing, which has been read out of the frame memory 51 during the period of reference frame time, to the display-processing unit 21 and the like, as a monitor image signal DV2 shown in FIG. 20 (G), thereby enabling the image-captured picture to be displayed at a frame rate that is identical with that of the standard image capture mode.

Further, when the user performs an instruction of the record, the control unit 61 controls the pixel interpolation, coding processing and the like of the image signal DV1 shown in FIG. 20 (D) to record the coded data on the recording media 42.

Figure 21:
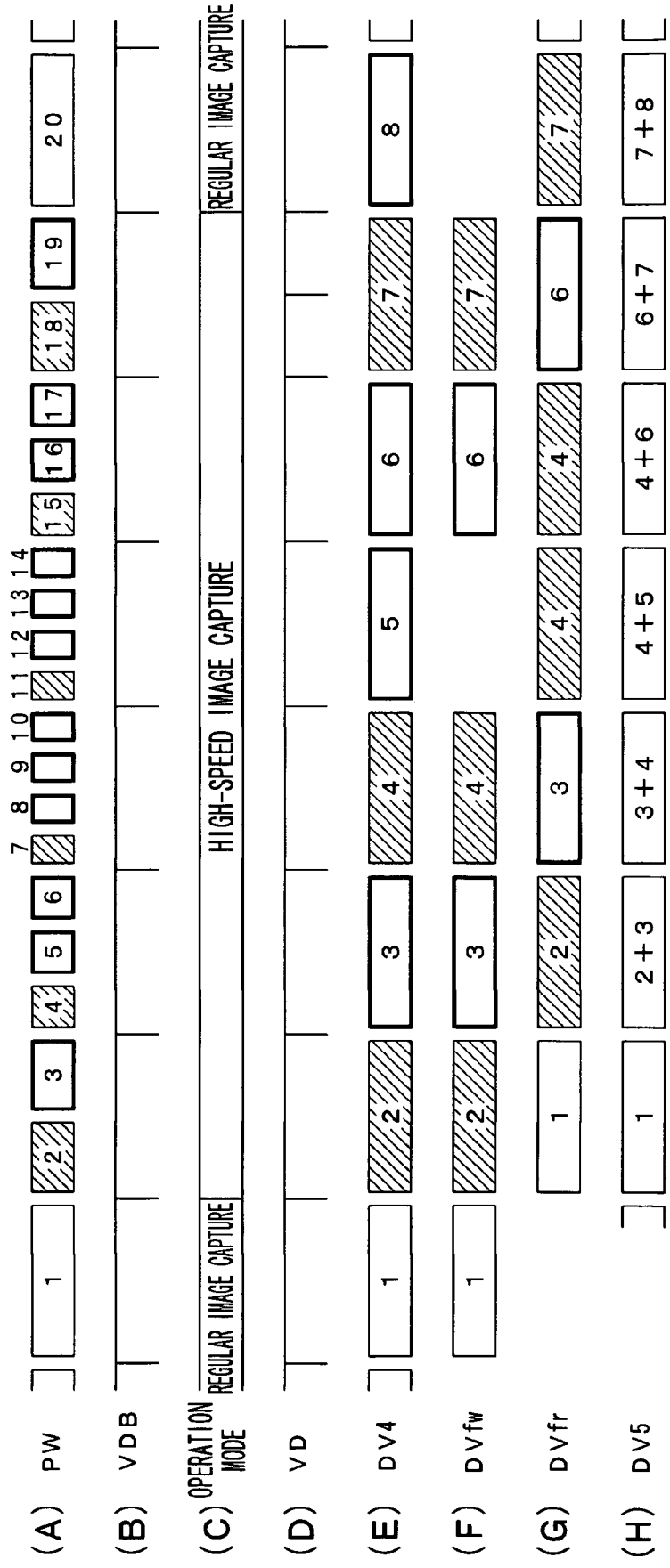
FIG. 21 are time diagrams of a case where an image obtained by performing the high-speed image capture at a variable rate is reproduced at the variable rate.
Figure 22:
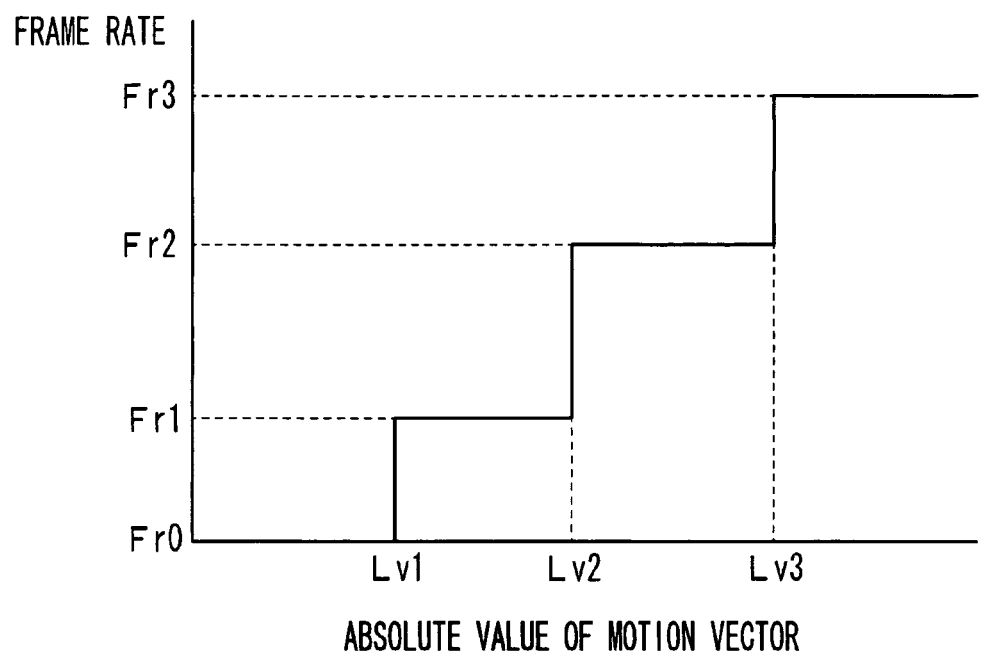
FIG. 22 is a diagram illustrating decision criteria for motion vectors.

The following will describe the reproduction operation of the image-captured picture recorded on the recording media 42 with reference to FIG. 21. FIG. 21 (A) shows frames PW of the image-captured picture coded and recorded on the recording media 42. FIG. 21 (B) shows a reference vertical synchronization signal VDB, FIG. 21 (C) shows operation modes of the image-capturing apparatus 10 when recording the image-captured picture, and FIG. 21 (D) shows a vertical synchronization signal VD.

During the period of reproduction time of the image-captured picture recorded at the high-speed image capture mode, the control unit 61 controls reading of the coded data from the recording media 42 and decode processing on it to generate the image signal DV4 of frame order in a image capture time. It is to be noted that FIG. 21 (E) shows the image signal DV4 obtained by performing the decode processing.

In the resolution conversion/image composition portion 130 of the camera-signal-processing unit 12, either the image signal obtained by performing the all-angle-of-view thinning-out read processing or the image signal obtained by performing the all-pixel partially read processing is written into the frame memory 51 and the image signal written into the frame memory 51 is read during the period of reference frame time. FIG. 21 (F) shows an image signal DVfw that is written into the frame memory 51 and FIG. 21 (G) shows an image signal DVfr that is read out of the frame memory 51.

Further, the resolution conversion/image composition portion 130 combines the image signal read out of the frame memory 51 with the image signal written into the frame memory 51. Alternatively, it combines the image signal by the all-angle-of-view thinning-out read processing, which is read out of the frame memory 51, with the image signal by the all-pixel partially read processing, which are obtained by performing the decode processing. FIG. 21 (H) shows an image signal DV5 that is output from the resolution conversion/image composition portion 130. When reaching a period of reproduction time of the image-captured picture recorded in the high-speed image capture mode, the resolution conversion/image composition portion 130 outputs an image signal of frame 2+3 in which the image signal of frame 2 that is an image signal by the all-angle-of-view thinning-out read processing and the image signal of frame 3 that is an image signal by the all-pixel partially read processing are combined. It next outputs an image signal of frame 3+4 in which the image signal of frame 3 that is an image signal by the all-pixel partially read processing and the image signal of frame 4 that is an image signal by the all-angle-of-view thinning-out read processing are combined, and an image signal of frame 4+5 in which the image signal of frame 4 that is an image signal by the all-angle-of-view thinning-out read processing and the image signal of frame 5 that is an image signal by the all-pixel partially read processing are combined, and it outputs successively an image signal of frame . . . + . . . . Namely, the resolution conversion/image composition portion 130 can output an image signal of the image-captured picture in which the motion of the subject varies according to the frame rate of the high-speed image capture mode and deterioration in the picture quality is prevented by the image signal obtained by performing the all-pixel partially read processing.

Further, if the control unit 61 controls reading out of the recording media 42 the coded data on which the compression processing is performed based on a coding system using predictive coding, without reading the coded data on which the compression processing is performed based on a coding system using no predictive coding, and decode processing, namely, if reading only the coded data of the moving picture and performing any decode processing on it to generate the image signal DV4, it is possible to output the reproduced picture in which that the motion of the subject is same speed even when the frame rate of the high-speed image capture mode varies.

Further, if changing the frame rate, the control unit 61 may change the frame rate automatically in a predetermined programmed order. The control unit 61 may also change the frame rate automatically based on the motion of the subject and record the image-captured picture having a high time resolution, i.e., a high frame rate when the motion of the subject is fast.

The following will describe operations for recording the image-captured picture with its frame rate being automatically changed according to a motion of the subject. Herein, the faster the motion of the subject is, the higher frame rate is set so that the image-captured picture having a high time resolution can be obtained. Further, a position of a region where the all-pixel partially read processing is performed is changed following the motion of the subject.

When the frame rate is automatically changed according to the motion of the subject, the control unit 61 controls the frame rate and the position of the rectangular region where the all-pixel partially read processing is performed based on a motion vector MV informed from the image compression/decompression unit 31. It is to be noted that if a number of pixels to be read in the image sensor 111 for a period of reference frame time is fixed, by determining the frame rate, an interval between the thinning-out reads in the all-angle-of-view thinning-out read processing and a region size of the rectangular region where the all-pixel partially read processing is performed are automatically determined.

Herein, when the frame rate is automatically changed according to the motion of the subject, the control unit 61 takes an absolute value of the motion vectors informed from the image compression/decompression unit 31 and then, compares it with judging reference values Lv1, Lv2, and Lv3 to judge the frame rate. These judging reference values Lv1, Lv2, and Lv3 are criteria for judging that define the frame rates which can expect reduction in blur generated on the basis of the motion of the subject and reference values in which the frame rates are successively increased in stages from same rate of "Fr0 (for example, 60 (fps)" to four times of "Fr3 (for example, 240 (fps)" according to increase of motion of each of the macro blocks that are indicated by the motion vectors.

Herein, when the absolute value of the motion vector is less than Lv1, the frame rate is set to the same as that of the standard image capture mode. When the absolute value of the motion vector stays in from more than Lv1 to less than Lv2, the frame rate is set so as to be twice that of the standard image capture mode as the high-speed image capture mode. When the absolute value of the motion vector stays in from more than Lv2 to less than Lv3, the frame rate is set so as to be triple that of the standard image capture mode, and when the absolute value of the motion vector is more than Lv3, the frame rate is set so as to be quadruple that of the standard image capture mode.

Figure 23:
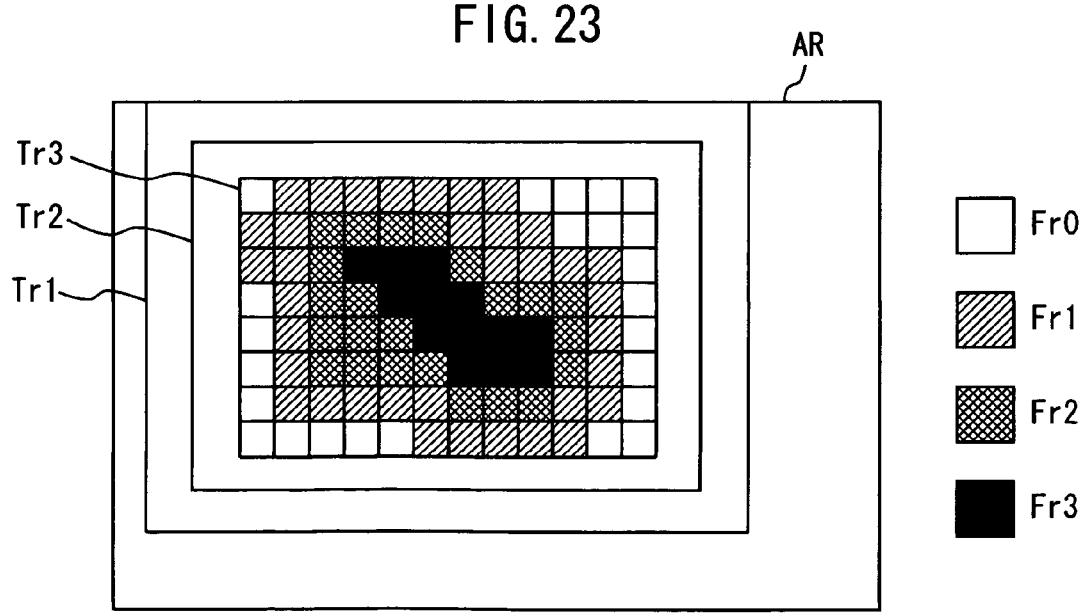
FIG. 23 is a schematic diagram illustrating frames in all-pixel partially read.

Further, the control unit 61 defines, from a detected motion vector, regions, for example, rectangular regions shown in FIG. 23, where the all-pixel partially read processing is performed. The control unit 61 resolves the detected motion vector into its horizontal and vertical components and performs statistic processing on the motion vector detected by each of the macro blocks by weighting-adding a weighting coefficient corresponding to a position of the macro block thereto, thereby defining image frames, Tr1 through Tr3. It is to be noted that the weighting-addition processing is carried out with a value of the weight coefficient being set so as to be increased in accordance with an extent to, for example, a center portion of the screen. Further, in this case, the image frames, Tr1 through Tr3, may be defined similarly as in a case where an image is captured at a fixed frame rate. It is to be noted that this FIG. 23 also shows a result of increase in the motion of each of the macro blocks, which is judged with judging reference values, Lv1 through Lv3.

The control unit 61 carries out the setting of the frame rate and the image frames, Tr1 through Tr3, for every period of reference frame time.

Figure 24:
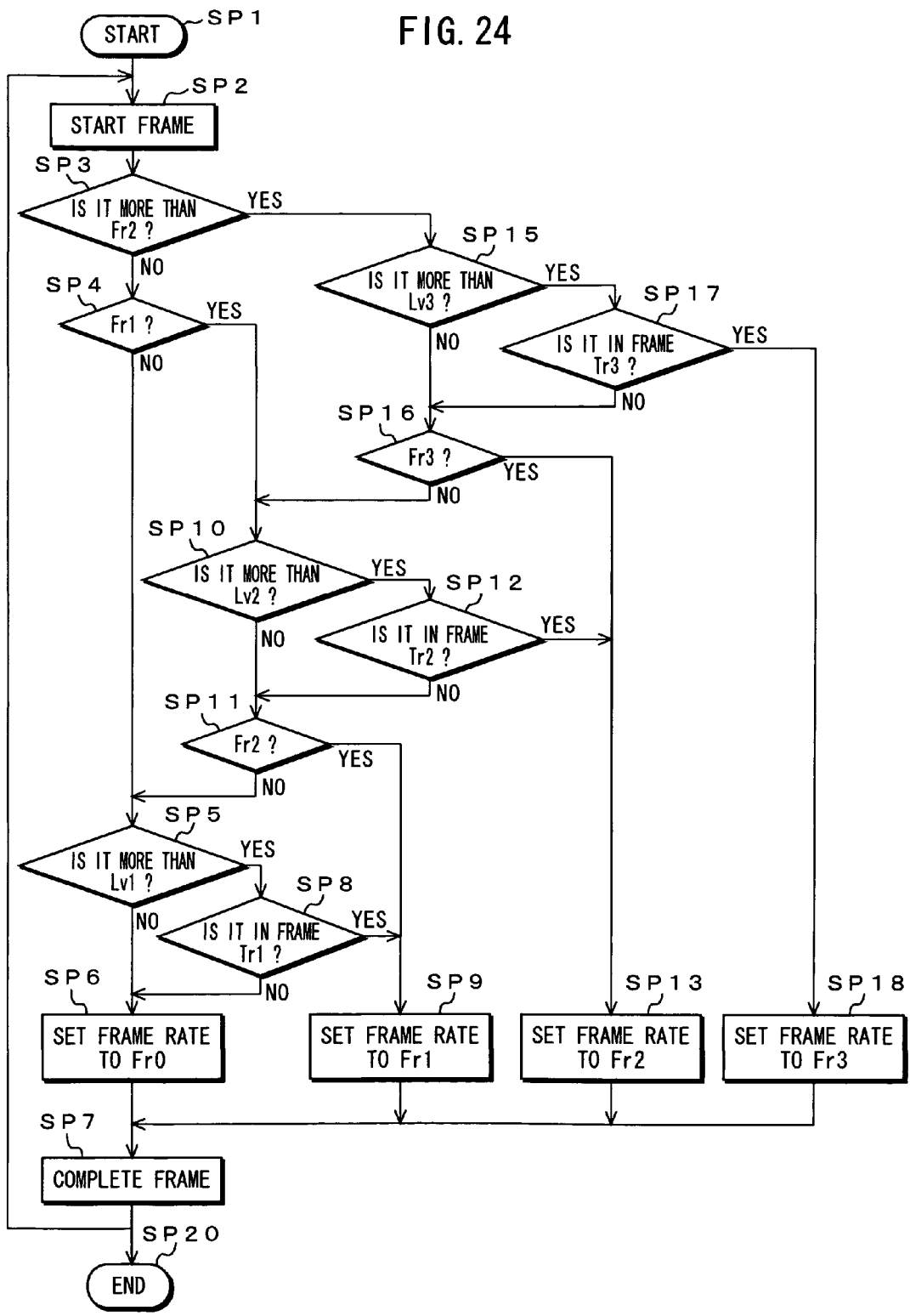
FIG. 24 is a flowchart for showing steps of setting processing for frame rate in a variable rate high-speed image capture.

The setting of the frame rate and the image frames is performed by carrying out a processing procedure shown in FIG. 24.

Namely, the control unit 61, if this processing procedure starts, shifts a step from a step SP1 to a step SP2 where processing on the corresponding frame starts, and then, at a following step SP3, it is determined whether or not a current frame rate is more than "Fr2" that is triple the reference frame rate. Herein, if a negative result is obtained, the control unit 61 shifts the step from the step SP3 to a step SP4.

The control unit 61, at the step SP4, determines whether or not a current frame rate is "Fr1" that is twice the reference frame rate. Herein, if a negative result is obtained, it shifts the step from the step SP4 to a step SP5 because the current frame is "Fr0" that is the same as the reference frame rate.

The control unit 61, at the step SP5, determines whether or not the macro block having a motion more than a first judging reference value Lv1 is detected. Herein, if a negative result is obtained, the control unit 61 shifts the step from the step SP5 to a step SP6 where a frame frequency for a period of following reference frame time is set to "Fr0", for example, 60 (fps) that is the same as the reference frame frequency. Further, at a following step SP7, the control unit 61 finishes the processing for the period of the corresponding reference frame time and returns to the step SP2.

Alternatively, if a positive result is obtained at the step SP5, the control unit 61 shifts the step from the step SP5 to a step SP8. The control unit 61 determines whether or not all the macro blocks each having a motion more than the first judging reference value Lv1 are included in the image frame Tr1 that has a frame rate only by one rank higher than the current frame rate, namely, that corresponds to twice of the reference frame rate. Herein, if a negative result is obtained, the control unit 61 shifts the step from the step SP8 to the step SP6 where a frame rate for a period of following reference frame time is set to "Fr0" that is the same as the reference frame rate. On the other hand, if a positive result is obtained at the step SP8, the control unit 61 shifts the step from the step SP8 to a step SP9 where a frame rate for a period of following reference frame time is set to "Fr1", for example, 120 (fps), that is twice the reference frame rate, and shifts to the step SP7.

If the current frame rate is "Fr1" that is twice the reference frame rate, the control unit 61 shifts the step from the step SP4 to a step SP10 because the positive result is obtained at the step SP4. The control unit 61, at the step SP10, determines whether or not the macro block having a motion more than a second judging reference value Lv2 is detected. Herein, if a negative result is obtained, the control unit 61 shifts the step from the step SP10 to a step SP11 where it is determined whether or not a current frame rate is "Fr2" that is triple the reference frame rate. In this case, by obtaining a negative result, the control unit 61 shifts the step from the step SP11 to the step SP5. Further, the control unit 61, by shifting to the step SP5, sets a frame rate for a period of following reference frame time to "Fr0" that is the same as the reference frame rate, if the frame rate can be decreased, namely, any macro block having a motion more than the first judging reference value Lv1 is not detected, or if no state is present where all the macro blocks each having a motion more than the first judging reference value Lv1 are included in the image frame Tr1 that corresponds to twice of the reference frame rate. On the contrary, the control unit 61 further keeps the current frame rate and shifts the processing to a next reference frame if the frame rate cannot be decreased, namely, if a macro block having a motion more than the first judging reference value Lv1 is detected, or if all the macro blocks each having a motion more than the first judging reference value Lv1 are included in the image frame Tr1 that corresponds to twice of the reference frame rate.

If a positive result is obtained at the step SP11, the control unit 61 shifts the step from the step SP11 to the step SP9 where it shifts the processing to a next reference frame with the frame rate for a period of the next reference frame time being kept to "Fr1" that is twice the reference frame rate, namely, the current frame rate. Further, if a positive result is obtained at the step SP10, the control unit 61 shifts the step from the step SP10 to a step SP12 where it determines whether or not all the macro blocks each having a motion more than the second judging reference value Lv2 are included in the image frame Tr2 that has a frame rate only by one rank higher than the current frame rate, namely, that corresponds to triple of the reference frame rate. Herein, if a negative result is obtained, the control unit 61 shifts the step from the step SP12 to the step SP11. Further, if a positive result is obtained at the step SP 1, the control unit 61 shifts the processing to a next reference frame with the frame rate being kept to that which is twice the reference frame rate. On the other hand, if a positive result is obtained at the step SP12, the control unit 61 shifts the step from the step SP12 to a step SP13 where a frame rate for a period of following reference frame time is set to "Fr2", for example, 180 (fps), that is triple the reference frame rate, and then, shifts its processing to a next reference frame.

If the current frame rate is "Fr2" which is triple the reference frame rate or "Fr3" which is quadruple the reference frame rate, the control unit 61 shifts the step from the step SP3 to a step SP15 by obtaining a positive result at the step SP3. The control unit 61, at the step SP15, determines whether or not the macro block having a motion more than a third judging reference value Lv3 is detected. Herein, if a negative result is obtained, the control unit 61 shifts the step from the step SP15 to a step SP16 where it determines whether or not a current frame rate is "Fr3" that is quadruple the reference frame rate. In this case, if the current frame rate is "Fr2" which is triple the reference frame rate, the control unit 61 shifts the step from the step SP16 to the step SP10 by obtaining a negative result at the step SP16. Further, the control unit 61, by shifting to the step SP10, sets a frame rate for a period of following reference frame time to "Fr1" that is twice the reference frame rate, if the frame rate can be decreased, namely, any macro block having a motion more than the second judging reference value Lv2 is not detected, or if no state is present where all the macro blocks each having a motion more than the second judging reference value Lv2 are included in an image frame Tr2 that correspond to triple of the reference frame rate. Alternatively, the control unit 61 sets the frame rate for a period of the following reference frame time to "Fr1" that is twice the reference frame rate based on the condition where the current frame rate is "Fr2" at processing following the step SP11 if any macro block having a motion more than the first judging reference value Lv1 is not detected, and if no state is present where all the macro blocks each having a motion more than the first judging reference value Lv1 are included in the image frame Tr1 that corresponds to twice of the reference frame rate. On the contrary, the control unit 61 keeps the current frame rate and shifts the processing to a next reference frame if the frame rate cannot be decreased, namely, a macro block having a motion more than the second judging reference value Lv2 is detected, or if all the macro blocks each having a motion more than the second judging reference value Lv2 are included in the image frame Tr2 that corresponds to triple of the reference frame rate.

If the current frame rate is "Fr3" which is quadruple the reference frame rate, a positive result is obtained at the step SP16 and in this case, the control unit 61 shifts the step from the step SP16 to the step SP13 where it sets a frame rate for a period of following reference frame time to "Fr2", for example, 180 (fps) that is triple the reference frame rate and shifts the processing to a next reference frame.

If a macro block having a motion more than the third judging reference value Lv3 is detected, a positive result is obtained at the step SP15 so that the control unit 61 shifts the step from the step SP15 to a step SP17. The control unit 61 determines, at the step SP17, whether or not all the macro blocks each having a motion more than the third judging reference value Lv3 are included in the image frame Tr3 that corresponds to quadruple of the reference frame rate. Herein, if a positive result is obtained, the control unit 61 shifts to step SP18 where it sets a frame rate for a period of following reference frame time to "Fr3", for example, 240 (fps) that is quadruple the reference frame rate, and then, shifts the processing to a next reference frame.

Further, if a negative result is obtained, the control unit 61 shifts the step from the step SP17 to the step SP16 where the frame rate for a period of following reference frame time is set to one that is triple the reference frame rate, namely, 180 (fps), based on the condition where the current frame rate is "Fr3" at processing following the step SP16.

According to the processing shown in FIG. 24, if the motion of the subject to be image-captured is increased, the control unit 61 sets the frame rate so as to be successively increased in stages. Alternatively, if the motion of the subject is decreased, the control unit 61 sets the frame rate so as to be successively increased in stages. Thus, the control unit 61 sets the frame rate automatically and selects an image frame corresponding to the set frame rate. Further, the image sensor 111 performs the all-pixel partially read processing such that all the pixels in the selected image frame can be read out.

When the user instructs reproduction of the image-captured picture recorded on the recording media 42, the control unit 61 acquires administration information on the image-captured picture which the user instructs to reproduce, from the record/reproduction-processing unit 41, reads the coded data out of the recording media 42, based on this administration information, as described above, and controls various parts so as to perform decode processing or combine the image signals.

Thus, if the user instructs the variable speed high-speed image capture, the control unit 61 dynamically switches the frame rate so as to be increased when the motion of the subject is large, thereby generating the image signal of this dynamically switched frame rate. Further, the control unit 61 dynamically switches the frame rate so as to be set to the frame rate of standard image capture mode when the motion of the subject is small, thereby generating the image signal of this dynamically switched frame rate. Therefore, if the motion is slow and the high-speed image capture of high frame rate is unnecessary, the image-capturing apparatus 10 can generate the image signal of a frame rate that is similar to the standard image capture mode, so that any wasteful spending can be avoided in the recording medium. Further, if the motion of the subject is large, the image signal of high frame rate is generated, so that the image-captured picture having a high time resolution can be obtained.

For example, when selecting the high-speed image capture mode in order to image-capture a high-speed moving subject without any motion blur or to obtain a slow-motion picture in which the high-speed moving subject has smooth motion, a background is almost in small motion state so that it seems that this is nearly meaningless portion in a case of high-speed image capture. Herein, as described above, when setting the frame rate and the region on which the all-pixel partially read processing is performed in the high-speed image capture mode according to the motion detection result, a portion in which picture quality is deteriorated by performing the all-angle-of-view thinning-out read processing is the background and the subject moving at high-speed is compensated for deterioration in the picture quality by the image signal obtained by performing the all-pixel partially read processing. Accordingly, the image-capturing apparatus 10 can perform the image capture on the subject moving at high-speed without any motion blur or obtain a slow-motion picture in which the subject moving at high-speed has smooth motion, without increasing an amount of signal on the image signal output from the image sensor 111 for a period of reference frame time.

Further, the image-capturing apparatus 10 can switch the frame rate smoothly corresponding to any change in the motion of the subject, thereby enabling an uncomfortable feeling generated in the reproduction time to be prevented. Namely, for example, if the frame rate is switched by manual operation based on the motion of the subject and the high-speed image capture is performed, it may be difficult to switch the frame rate suitably according to the motion of the subject. Therefore, if reproducing a series of the image signals, the frame rate of which is switched, the frame rate suddenly changes to cause remarkable uncomfortable feeling to occur. However, since the frame rate is dynamically switched corresponding to the change in the motion of the subject, it is possible to prevent the uncomfortable feeling generated in the reproduction time.

Additionally, the image-capturing apparatus 10 generates the image signal by setting the rectangular region on which the all-pixel partially read processing is performed so as to follow the motion of the subject. Therefore, this image-capturing apparatus 10 can perform the high-speed image capture surely on the subject that is necessary for the high-speed image capture and prevent the picture quality thereof from deteriorating even if the rectangular region from which all the pixels are read is set to small region and an increase in the rate of image signal in the high-speed image capture time is reduced.

In the image-capturing apparatus 10, the motion of the subject used in setting a size of the rectangular region from which all the pixels are read, a position thereof, and the frame rate is detected using the motion vector detected in the coding processing of the image signal. Therefore, in this image-capturing apparatus 10, the motion of the subject is detected using a configuration of the image compression/decompression unit 31 effectively, so that the entire configuration may be simplified compared with a case where the motion of the subject is separately detected.

On the contrary, when reproducing, in variable speed, the image signal on which the high-speed image capture is performed in variable speed, the image signals are successively reproduced on a image-captured order and then, the image signal by the all-pixel partially read processing and the image signal by the all-angle-of-view thinning-out read processing in this image signal are processed in a similar manner and displayed. In this case, this image-capturing apparatus 10 can perform the slow-motion-reproduction by reducing the reproduction speed automatically in a portion in which the motion is fast and switch the reproduction speed based on the change in an amount of the motion without giving any uncomfortable feeling.

It is to be noted that although the case where the angle of view in the all-pixel partially read is compensated to the angle of view in the all-angle-of-view thinning-out read has been described in the above-mentioned embodiments, this invention is not limited to this; On the contrary, the angle of view in the all-angle-of-view thinning-out read may be also compensated to the angle of view in the all-pixel partially read. This enables an image in which the subject is zoomed up to be displayed.

Further, although the case where the image signals on the all angle of views are generated by applying the all-angle-of-view thinning-out read thereto has been described in the above-mentioned embodiments, this invention is not limited to this and if any processing ability that is sufficiently suited to practical use is provided, the image signals on the all angle of views may be generated by applying the all-angle-of-view and all-pixels read thereto. In this case, the image signal of the all angle of views may be also generated by switching from the all-angle-of-view and all-pixels read to the all-angle-of-view thinning-out read based on the increase in the frame rate.

Further, although the case where the image signal is generated in the progressive system has been described in the above-mentioned embodiments, this invention is not limited to this and may be also applied to a case where the image signal is generated in the interlaced system.

INDUSTRIAL APPLICABILITY

The present invention is applicable to, for example, an image-capturing apparatus.

The invention claimed is:
1. An image-capturing apparatus which is provided with:
an image sensor that generates an image signal of an image-captured picture;
a control unit that controls said image sensor to switch in units of a set period of time between an all-angle-of-view thinning-out read processing in which a thinning-out read is performed on a pixel in an effective image area to generate said image signal and an all-pixel partially read processing in which all the pixels of a partial region of said effective image area are read out of the partial region to generate said image signal; and
a resolution conversion/image composition portion for multiplying an image signal generated according to said all-angle-of-view thinning-out read processing by a first gain to generate a first gain adjusted signal, multiplying an image signal generated according to said all-pixel partially read processing by a second gain to generate a second gain adjusted signal, and adding the first gain adjusted signal and second gain adjusted signal to generate an output signal,
said first gain and said second gain depending on boundaries within said image signal generated according to said all-pixel partially read processing,
in said all-angle-of view thinning-out read processing a thinning-out pattern is changed every frame.
2. The image-capturing apparatus according to claim 1 wherein said control unit controls said image sensor to perform said all-angle-of-view thinning-out read processing and said all-pixel partially read processing if said unit of the set period of time is shorter than a predetermined unit of the period of reference time.
3. The image-capturing apparatus according to claim 2 wherein said control unit controls said image sensor to perform said all-angle-of-view thinning-out read processing at a top unit of the set period of time within said unit of the period of reference time and said all-pixel partially read processing at another, unit of the set period of time within said unit of the period of reference time.
4. The image-capturing apparatus according to claim 3, which is further provided with a pixel interpolation portion that performs a pixel interpolation to generate a signal relative to a thinned-out pixel,
wherein said pixel interpolation portion performs said pixel interpolation on the image signal obtained by said all-angle-of-view thinning-out read processing.
5. The image-capturing apparatus according to claim 4 wherein said unit of the set period of time is changeable.

6. The image-capturing apparatus according to claim 5 wherein said control unit controls said image sensor to set an interval between said thinning-out reads so as to be extended and the partial region of said effective image area so as to be restricted if said unit of the set period of time is made shorter or to set the interval between said thinning-out reads so as to be shortened and the partial region of said effective image area so as to be enlarged if said unit of the set period of time is made longer.

7. The image-capturing apparatus according to claim 6, which is further provided with a motion detection unit that detects a motion using said pixel-interpolated image signal,
wherein said control unit controls said image sensor to perform said all-pixel partially read processing based on the motion detected by said motion detection unit with a subject having motion being included in the partial region of said effective image area.

8. The image-capturing apparatus according to claim 7 wherein said control unit sets said unit of the set period of time so as to be extended if the motion is large or sets said unit of the set period of time so as to be shortened if the motion is small.

9. The image-capturing apparatus according to claim 4, which is further provided with an image compression unit that performs compression processing on said image signal to generate coded data; and
a recording unit that records said coded data on recording medium,
wherein said image compression unit performs the compression processing on said image signal that is pixel-interpolated in said all-angle-of-view thinning-out read processing based on a coding system using predictive coding and performs the compression processing on the image signal that is obtained by performing said all-pixel partially read processing based on a coding system without using the predictive coding.

10. The image-capturing apparatus according to claim 9 wherein said image compression unit detects said motion using said pixel-interpolated image signal, and
wherein said control unit controls said image sensor to perform said all-pixel partially read processing based on said motion with said subject having the motion being included in the partial region of said effective image area.

11. The image-capturing apparatus according to claim 9, which is further provided with:
a reproducing unit that reads the coded data recorded on said recording medium;
an image decompression unit that decompresses the coded data read by said reproducing unit to generate the image signal; and
an image composition unit that performs composition using the image signal generated by said image decompression unit,
wherein said image composition unit combines said image signal that is pixel-interpolated in said all-angle-of-view thinning-out read processing and the image signal that is obtained by performing said all-pixel partially read processing.

12. The image-capturing apparatus according to claim 11 wherein said reproducing unit reads the coded data on which the compression processing is performed based on the coding system using said predictive coding out of said recording medium without reading the coded data on which the compression processing is performed based on the coding system not using said predictive coding, and
wherein said image decompression unit decompresses the coded data read by said reproducing unit and outputs it as an image signal for every unit of the period of reference time.

13. The image-capturing apparatus according to claim 1 wherein said all-angle-of-view thinning-out read processing includes at least one of pixel thinning-out processing and line thinning-out processing.

14. The image-capturing apparatus according to claim 1, which is further provided with a display unit,
wherein said display unit displays an image based on the image signal obtained by performing said all-angle-of-view thinning-out read processing.

15. An image-capturing method for generating an image signal of an image-captured picture using an image sensor, the method comprising:
an all-angle-of-view thinning-out read step of generating said image signal by performing a thinning-out read on a pixel in an effective image area of the image sensor;
an all-pixel partially read step of generating said image signal by reading all the pixels of a partial region of said effective image area out of the partial region; and
an output signal generation step of multiplying an image signal generated according to said all-angle-of-view thinning-out read step by a first gain to generate a first gain adjusted signal, multiplying an image signal generated according to said all-pixel partially read step by a second gain to generate a second gain adjusted signal, and adding the first gain adjusted signal and second gain adjusted signal to generate an output signal,
said first gain and said second gain depending on boundaries within said image signal generated according to said all-pixel partially read step,
wherein said all-angle-of-view thinning-out read step and said all-pixel partially read step are switched in units of a set period of time,
in said all-angle-of view thinning-out read step a thinning-out pattern is changed every frame.

16. A recording apparatus which is provided with:
an image compression unit that performs compression processing on an image signal of an image-captured picture generated by allowing an image sensor to switch in units of a set period of time between an all-angle-of-view thinning-out read processing in which a thinning-out read is performed on a pixel in an effective image area to generate said image signal and an all-pixel partially read processing in which all the pixels of a partial region of said effective image area are read-out of the partial region to generate said image signal so as to generate coded data;
a recording unit that records said coded data; and
a resolution conversion/image composition portion for multiplying an image signal generated according to said all-angle-of-view thinning-out read processing by a first gain to generate a first gain adjusted signal, multiplying an image signal generated according to said all-pixel partially read processing by a second gain to generate a second gain adjusted signal, and adding the first gain adjusted signal and second gain adjusted signal to generate an output signal,
said first gain and said second gain depending on boundaries within said image signal generated according to said all-pixel partially read processing,
wherein said image compression unit performs the compression processing on the image signal obtained by performing said all-angle-of-view thinning-out read processing based on a coding system using predictive coding and performs the compression processing on the image signal obtained by performing said all-pixel partially read processing based on a coding system without using the predictive coding,
in said all-angle-of view thinning-out read processing a thinning-out pattern is changed every frame.

17. The recording apparatus according to claim 16, which is further provided with a pixel interpolation portion that performs a pixel interpolation to generate a signal relative to a thinned-out pixel, wherein said pixel interpolation portion performs said pixel interpolation on the image signal obtained by said all-angle-of-view thinning-out read processing, and wherein said image compression unit performs the compression processing on said image signal that is pixel-interpolated in said all-angle-of-view thinning-out read processing by said pixel interpolation portion based on the coding system using the predictive coding.

18. A recording method which is provided with:

a step of performing compression processing on an image signal obtained by performing an all-angle-of-view thinning-out read processing based on a coding system using predictive coding to generate coded data among image signals of an image-captured picture generated by allowing an image sensor to switch in units of a set period of time between said all-angle-of-view thinning-out read processing in which a thinning-out read is performed on a pixel in an effective image area to generate said image signal and an all-pixel partially read processing in which all the pixels of a partial region of said effective image area are read out of the partial region to generate said image signal;

a step of performing compress processing on the image signal obtained by performing said all-pixel partially read processing based on a coding system without using the predictive coding to generate coded data;

a step of recording items of said coded data; and a step of generating an output signal by multiplying an image signal generated according to said all-angle-of-view thinning-out read processing by a first gain to generate a first gain adjusted signal, multiplying an image signal generated according to said all-pixel partially read processing by a second gain to generate a second gain adjusted signal, and adding the first gain adjusted signal and second gain adjusted signal to generate an output signal, said first gain and said second gain depending on boundaries within said image signal generated according to said all-pixel partially read processing, in said all-angle-of view thinning-out read processing a thinning-out pattern is changed every frame.

19. A reproducing apparatus which is provided with:

a reproduction unit that reads coded data out of recording medium on which after an image sensor has switched in units of a set period of time between an all-angle-of-view thinning-out read processing in which a thinning-out read is performed on a pixel in an effective image area to generate an image signal and an all-pixel partially read processing in which all the pixels of a partial region of the effective image area are read out of the partial region to generate an image signal, the image signal obtained by performing the all-angle-of-view thinning-out read processing is compression-processed based on a coding system using predictive coding and recorded as the coded data and the image signal obtained by performing the all-pixel partially read processing is compression-processed based on a coding system without using the predictive coding and recorded as the coded data;

an image decompression unit that decompresses the read coded data to generate the image signal;

an image composition unit that performs composition using the image signal generated in the image decompression unit; and a resolution conversion/image composition portion for multiplying an image signal generated according to said all-angle-of-view thinning-out read processing by a first gain to generate a first gain adjusted signal, multiplying an image signal generated according to said all-pixel partially read processing by a second gain to generate a second gain adjusted signal, and adding the first gain adjusted signal and second gain adjusted signal to generate an output signal, said first gain and said second gain depending on boundaries within said image signal generated according to said all-pixel partially read processing, wherein the image composition unit combines the image signal obtained by performing the all-angle-of-view thinning-out read processing and the image signal obtained by performing the all-pixel partially read processing, in said all-angle-of view thinning-out read processing a thinning-out pattern is changed every frame.

20. The reproducing apparatus according to claim 19 wherein said reproducing unit reads the coded data on which the compression processing is performed based on the coding system using said predictive coding out of said recording medium without reading the coded data on which the compression processing is performed based on the coding system not using said predictive coding, and wherein said image decompression unit decompresses said coded data and outputs it as an image signal for every unit of the period of reference time.

21. A reproducing method which is provided with:

a step of reading coded data out of recording medium on which after an image sensor has switched in units of a set period of time between an all-angle-of-view thinning-out read processing in which a thinning-out read is performed on a pixel in an effective image area to generate an image signal and an all-pixel partially read processing in which all the pixels of a partial region of the effective image area are read out of the partial region to generate an image signal, the image signal obtained by performing said all-angle-of-view thinning-out read processing is compressed based on a coding system using predictive coding and recorded as the coded data and the image signal obtained by performing said all-pixel partially read processing is compressed based on a coding system without using the predictive coding and recorded as the coded data;

a step of decompressing said read coded data to generate the image signal;

a step of combining the image signal by said all-angle-of-view thinning-out read processing and the image signal obtained by performing said all-pixel partially read processing; and a step of generating an output signal by multiplying an image signal generated according to said all-angle-of-view thinning-out read processing by a first gain to generate a first gain adjusted signal, multiplying an image signal generated according to said all-pixel partially read processing by a second gain to generate a second gain adjusted signal, and adding the first gain adjusted signal and second gain adjusted signal to generate an output signal, said first gain and said second gain depending on boundaries within said image signal generated according to said all-pixel partially read processing, in said all-angle-of view thinning-out read processing a thinning-out pattern is changed every frame.

* * * * *